US010691793B2

(12) United States Patent
Ventura

(10) Patent No.: US 10,691,793 B2
(45) Date of Patent: Jun. 23, 2020

(54) PERFORMANCE OF DISTRIBUTED SYSTEM FUNCTIONS USING A TRUSTED EXECUTION ENVIRONMENT

(71) Applicant: AlphaPoint, New York, NY (US)

(72) Inventor: Giuseppe Ventura, New York, NY (US)

(73) Assignee: ALPHAPOINT, New York, NY (US)

( * ) Notice: Subject to any disclaimer, the term of this patent is extended or adjusted under 35 U.S.C. 154(b) by 321 days.

(21) Appl. No.: 15/899,914

(22) Filed: Feb. 20, 2018

(65) Prior Publication Data

US 2018/0239897 A1    Aug. 23, 2018

Related U.S. Application Data

(60) Provisional application No. 62/460,987, filed on Feb. 20, 2017.

(51) Int. Cl.
| | |
|---|---|
| *G06F 21/53* | (2013.01) |
| *G06F 21/12* | (2013.01) |
| *H04L 29/06* | (2006.01) |
| *H04L 9/06* | (2006.01) |
| *G06F 21/60* | (2013.01) |
| *G06F 21/74* | (2013.01) |

(Continued)

(52) U.S. Cl.
CPC ........... *G06F 21/53* (2013.01); *G06F 21/121* (2013.01); *G06F 21/57* (2013.01); *G06F 21/604* (2013.01); *G06F 21/74* (2013.01); *H04L 9/0637* (2013.01); *H04L 63/10* (2013.01); *H04L 67/10* (2013.01)

(58) Field of Classification Search
None
See application file for complete search history.

(56) References Cited

U.S. PATENT DOCUMENTS

2016/0275461 A1    9/2016  Sprague et al.
2016/0379212 A1*  12/2016  Bowman .......... G06Q 20/38215
                                                                705/71
(Continued)

OTHER PUBLICATIONS

International Searching Authority, International Search Report and Written Opinion for International Application No. PCT/US2018/018772, dated Apr. 6, 2018, 14 pages, European Patent Office, Netherlands.

(Continued)

*Primary Examiner* — Fatoumata Traore
(74) *Attorney, Agent, or Firm* — Alston & Bird LLP

(57) ABSTRACT

Example embodiments provide for secure storage and accessing of confidential information by a distributed system and for securely executing a function of the distributed system. Responsive to processing a function request identifying a function of the distributed system by a node computing entity, application program code corresponding to the function is accessed within a trusted execution environment. Based on data stored in a secure ledger maintained by the distributed system, the application program code is executed to generate a result within the trusted execution environment. A new entry comprising the result is generated and at least a portion thereof is encrypted using an encryption key within the trusted execution environment. The encrypted new entry is posted to the secure ledger.

16 Claims, 9 Drawing Sheets

(51) Int. Cl.
*G06F 21/57* (2013.01)
*H04L 29/08* (2006.01)

(56) References Cited

U.S. PATENT DOCUMENTS

2017/0244704 A1* 8/2017 Brickell .............. H04L 63/0876
2017/0353309 A1* 12/2017 Gray .................... H04L 9/3236

OTHER PUBLICATIONS

Lind, Joshua, et al., "Teechan: Payment Channels Using Trusted Execution Environments", ARXIV.Org, Dec. 22, 2016, pp. 1-15, Cornell University Library, U.S.

International Preliminary Examining Authority, Second Written Opinion for International Application No. PCT/US2018/018772, dated Jan. 18, 2019, 5 pages, European Patent Office, Germany.

* cited by examiner

PERFORMANCE OF DISTRIBUTED SYSTEM FUNCTIONS USING A TRUSTED EXECUTION ENVIRONMENT

CROSS-REFERENCE TO RELATED APPLICATIONS

This application claims priority to U.S. Application No. 62/460,987, filed Feb. 20, 2017 the content of which is incorporated by reference herein in its entirety.

FIELD

Various embodiments relate generally to the field of computer system architecture and administrating a distributed system. An example embodiment relates to a trusted application network and a corresponding secure ledger and execution of functions corresponding to the secure ledger within a trusted execution environment.

BACKGROUND

Distributed systems are computing systems comprising a plurality of nodes that may be geographically remote with respect to one another. The plurality of nodes may communicate via one or more networks, which may make the distributed system subject to various attacks from other computing entities accessing the one or more networks. Such attacks may cause the leaking of confidential information stored by and/or accessible to the distributed system, unauthorized modification of program code used to implement various system functions (e.g., smart contracts and/or the like), and/or lead to other weakness that may compromise the security of confidential information and/or the integrity of transactions and/or actions performed and/or validated by the distributed system.

BRIEF SUMMARY OF SOME EXAMPLE EMBODIMENTS

Various embodiments provide methods, apparatuses, computer program products, systems, and/or the like that provide improved security of confidential information stored by and/or accessible to a distributed system and/or ensure the integrity of transactions and/or actions performed and/or validated by the distributed system. In various embodiments, a distributed system may comprise a plurality of node computing entities in communication via one or more networks. The node computing entities may store and/or execute computer code corresponding to trusted applications that are petitioned into a secure domain and a supplementary domain. The secure domain of a trusted application is stored and/or executed within a trusted execution environment. One or more trusted applications may be configured to inter-communicate, perhaps across two or more node computing entities of the distributed system, to provide a trusted application network. A secure ledger corresponding to the trusted application network may store encrypted information/data accessible by the secure domain of the trusted applications of the trusted application network. In an example embodiment, the secure ledger is a distributed ledger such as, for example, a blockchain database. In an example embodiment, the one or more trusted applications of a trusted application network may intercommunicate (e.g., using public/private and/or other key encryption of information/data) via the secure ledger.

According to a first aspect of the present invention, a method for securely executing a function of a distributed system is provided. In an example embodiment, the method comprises, responsive to processing a function request identifying a function of the distributed system by a node computing entity, accessing application program code corresponding to the function within a trusted execution environment. The node computing entity comprises (a) a processor, a memory, and a communication interface and (b) one or more partitions defining the trusted execution environment. The method further comprises, based at least in part on data stored in a secured shared resource maintained by the distributed system, executing the application program code to generate a result within the trusted execution environment; generating a new entry comprising the result and encrypting at least a portion of the new entry using an encryption key, within the trusted execution environment; and posting the encrypted new entry to the secure ledger.

According to another aspect of the present invention, an apparatus for securely executing a function of a distributed system is provided. The apparatus is a node of a plurality of nodes of the distributed system. The apparatus comprises at least one processor, a communications interface configured for communicating via at least one network, and at least one memory storing computer program code. The apparatus further comprises at least one partition defining a trusted execution environment. The at least one memory and the computer program code are configured to, with the processor, cause the apparatus to at least, receive and process a function request identifying a function of the distributed system; responsive to processing the function request, access application program code corresponding to the function within the trusted execution environment. The at least one memory and the computer program code are further configured to, with the processor, cause the apparatus to at least, based on data stored in a secured shared resource maintained by the distributed system, execute the application program code to generate a result within the trusted execution environment; generate a new entry comprising the result and encrypt at least a portion of the new entry using an encryption key, within the trusted execution environment; and post the encrypted new entry to the secure ledger.

According to yet another aspect of the present invention, a computer program product for securely executing a function of a distributed system is provided. In an example embodiment, the computer program product comprises at least one non-transitory computer-readable storage medium having computer-executable program code instructions stored therein. The computer-executable program code instructions comprise program code instructions configured to, when executed by a processor of a node computing entity of a plurality of node computing entities of the distributed system, cause the node computing entity to, responsive to processing a function request identifying a function of the distributed system, access application program code corresponding to the function within a trusted execution environment, the node computing entity (a) comprises the processor, a memory, and a communication interface and (b) comprises one or more partitions defining the trusted execution environment. The computer-executable program code instructions further comprise program code instructions configured to, when executed by the processor of the node computing entity cause the node computing entity to, based on data stored in a secured shared resource maintained by the distributed system, execute the application program code to generate a result within the trusted execution environment; generate a new entry comprising the result and encrypt at least a portion of the new entry using an encryption key, within the trusted execution environment; and post the encrypted new entry to the secure ledger.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
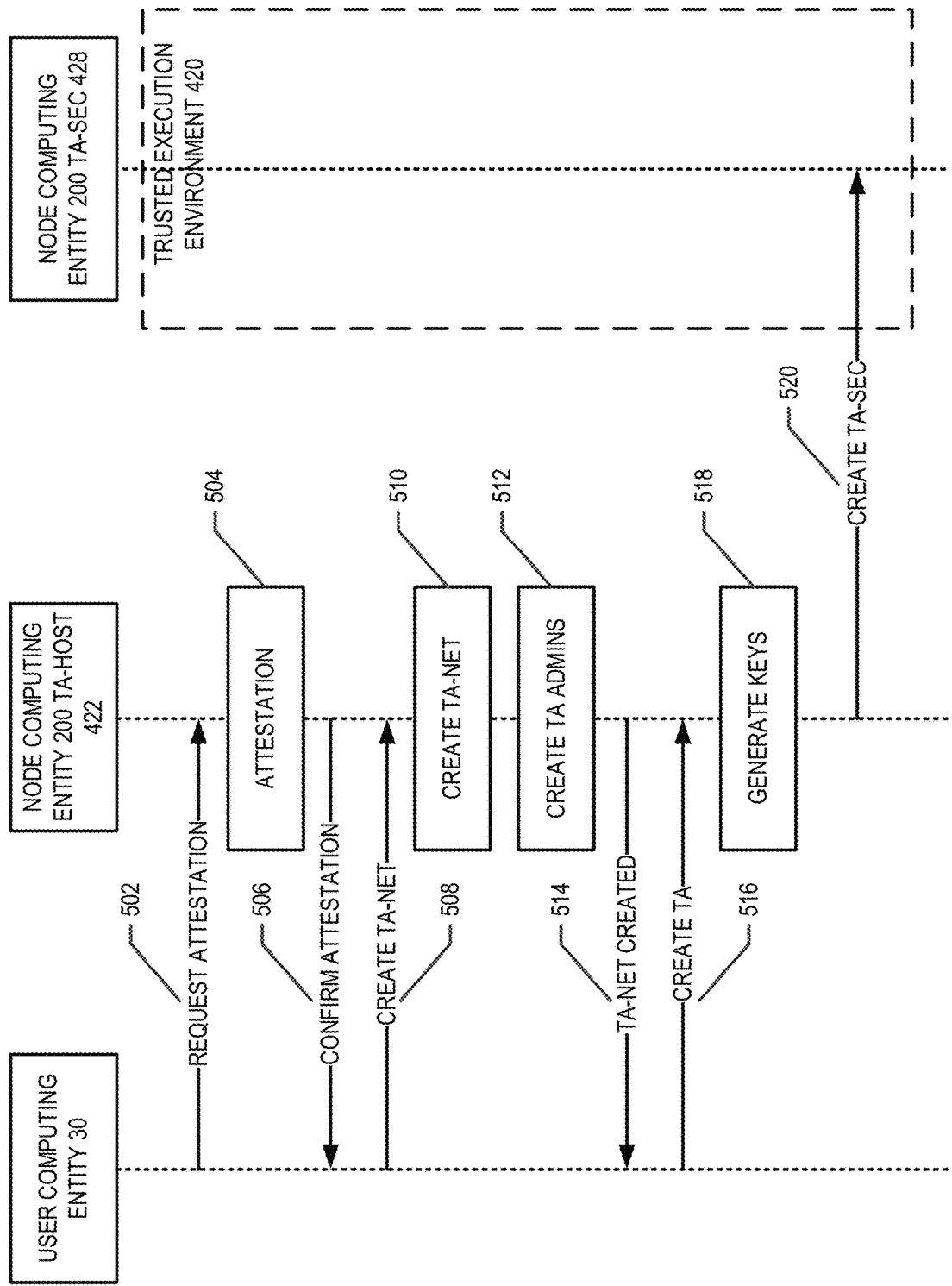
Figure 6:
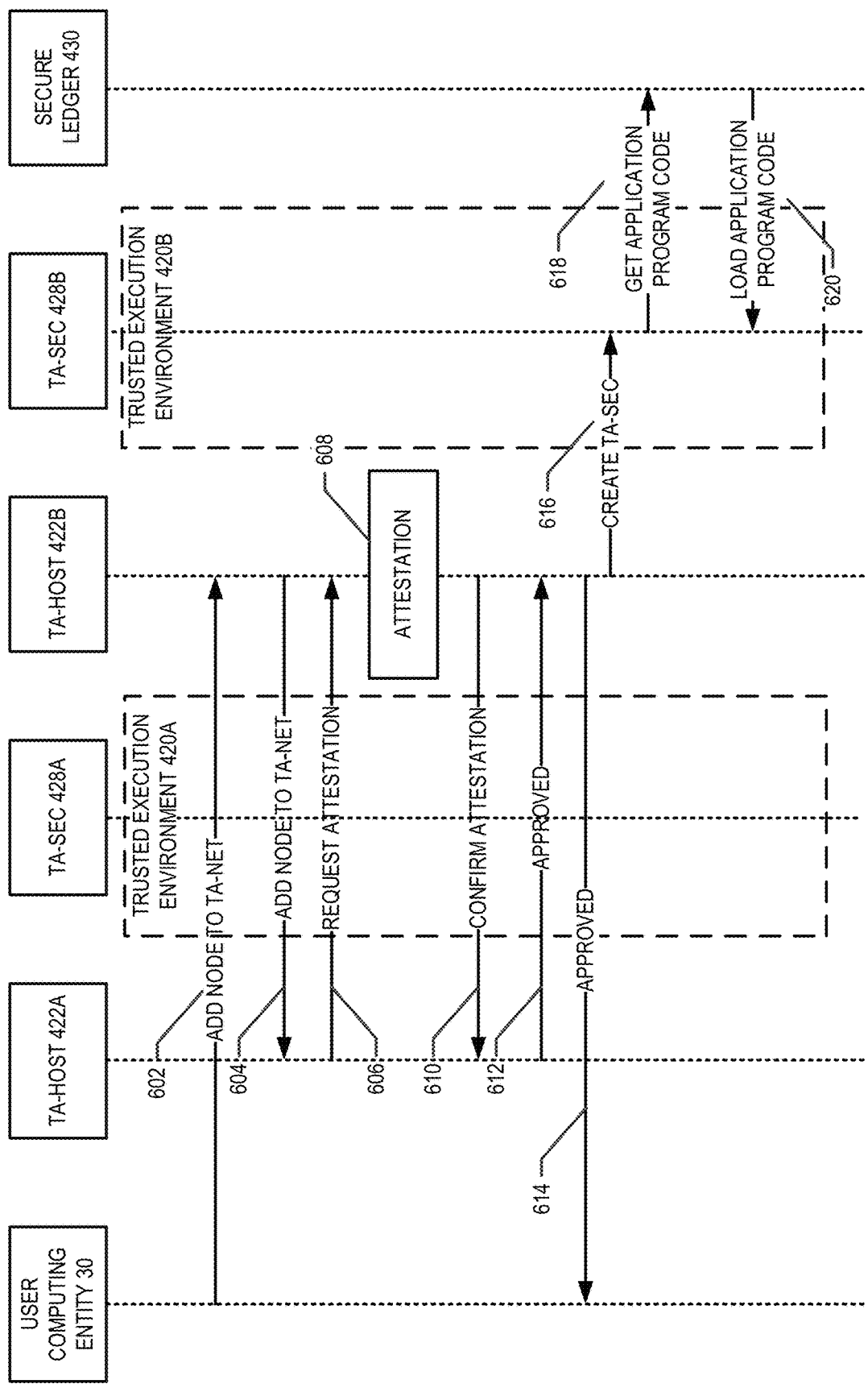
Figure 7:
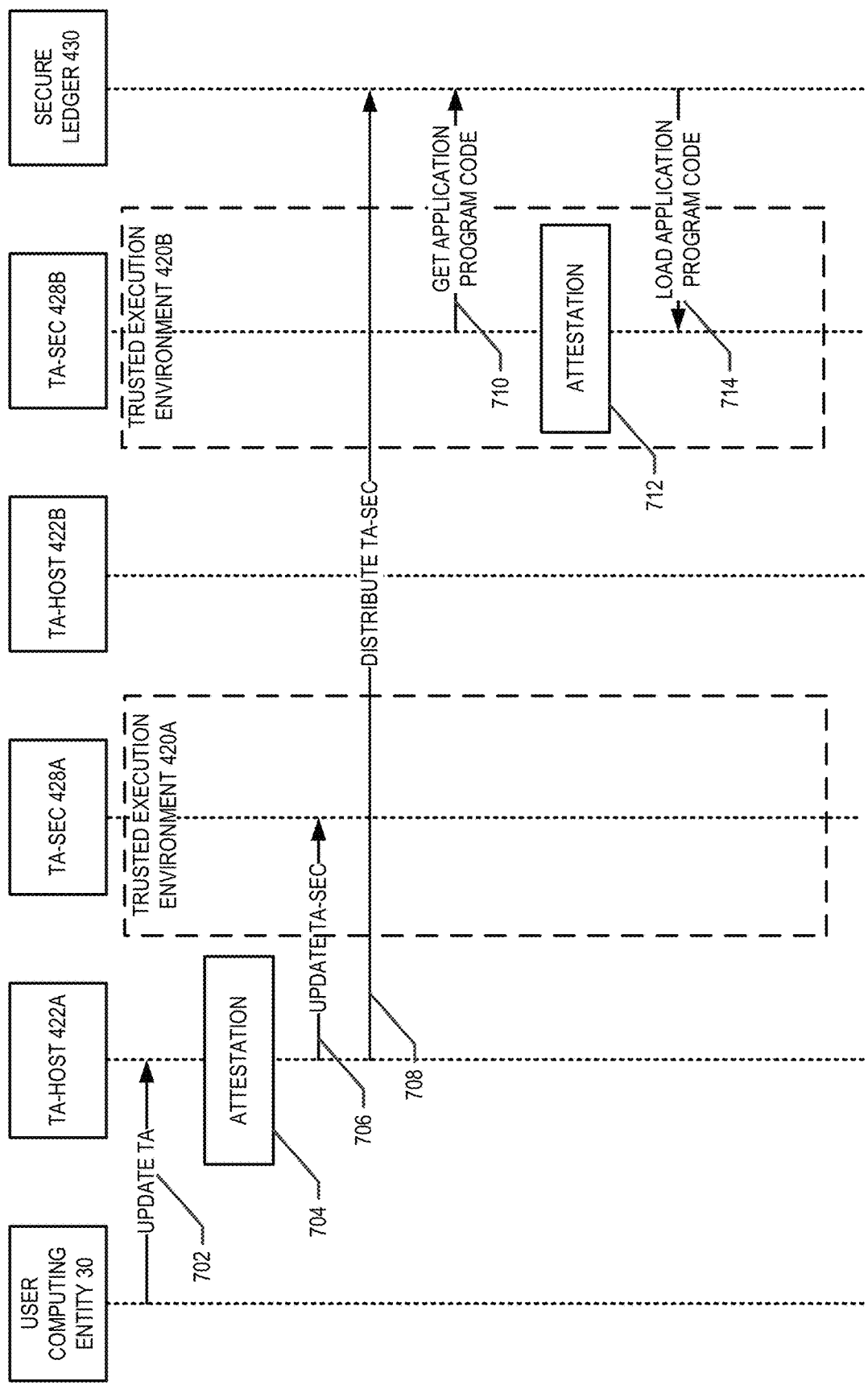
Figure 8:
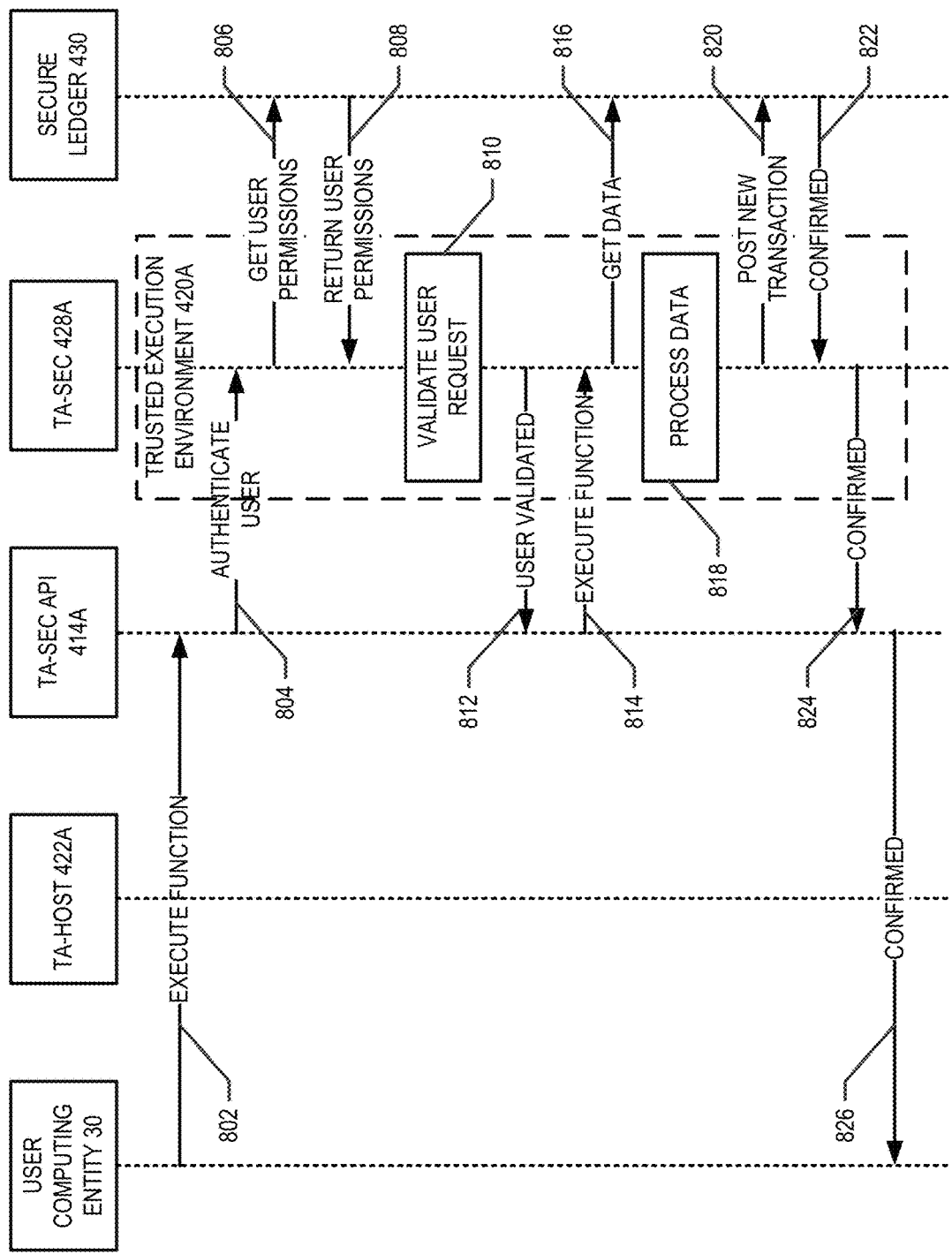

FIG. 5 provides a data flow diagram of an example process of creating a trusted application network, in accordance with an example embodiment of the present invention;

FIG. 6 provides a data flow diagram of an example process of adding a node to a trusted application network, in accordance with an example embodiment of the present invention;

FIG. 7 provides a data flow diagram of an example process of updating a secure domain in the trusted application partition, in accordance with an example embodiment of the present invention; and FIG. 8 provides a data flow diagram of an example process of executing a function in the secure domain in the trusted application partition.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. GENERAL OVERVIEW

In various embodiments, methods, systems, apparatuses, computer program products, and/or the like are provided for executing and/or providing features of and/or managing a distributed system. In various embodiments, the distributed system comprises a plurality of nodes, wherein each node may comprise one or more node computing entities. For example, various embodiments provide for the creation and/or generation of a trusted application network (TA-NET), adding a node (e.g., a node computing entity) to an existing TA-NET, updating the secure domain of a trusted application (TA-SEC), and/or executing and/or providing functions of a trusted application. In various embodiments, the TA-NET and/or portions thereof may operate and/or be executed in a trusted execution environment to preserve information/data confidentiality and to prevent tampering with the applications and/or application computer code corresponding thereto. In various embodiments, a secure ledger and/or other secured shared resources may be maintained, updated, and/or accessed via a trusted application and/or a TA-NET. In various embodiments, the secure ledger may be a data store in which at least a portion of the information/data stored therein is encrypted using an encryption key corresponding to the TA-NET. In an example embodiment, the secure ledger may be a distributed ledger such as, for example, a blockchain database. The TA-SEC may be executed and/or access information/data through a trusted execution environment of the corresponding node computing entity. For example, a node computing entity may comprise one or more partitions (e.g., logical partitions, disk partitions, and/or the like) that define one or more trusted execution environments. The TA-SEC may receive requests and/or the like via a secure application programming interface (API) and/or supplemental API (e.g., via a supplemental domain (TA-SUP) of the trusted application that is executed outside of the trusted execution environment) that is provided via a trusted application host (TA-HOST) operating and/or provided via the node computing entity. In an example embodiment, one or more functions of a trusted application may be smart contracts and/or the execution of smart contracts. In general, a smart contract is a computer protocol intended to digitally and/or automatically facilitate, verify, and/or enforce the negotiation and/or performance of a contract via trackable and/or irreversible transactions.

Various embodiments provide a significant enhancement of the security of confidential information stored, accessed, and/or used by a distributed system. This security improvement is achieved, in an example embodiment, by isolating business application logic and data from application users and administrators by executing the business application logic (e.g., smart contracts and/or the like) and accessing the confidential information/data within the trusted execution environment. For example, application users and administrators may interact with a trusted application via secure and/or supplementary APIs, where common role-based access controls may be implemented. This allows for public/private keys and/or other encryption methods for signing/authorization, data access control, and/or encryption to be managed within and among distributed trusted applications through a secure TA-NET.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

Figure 1A:
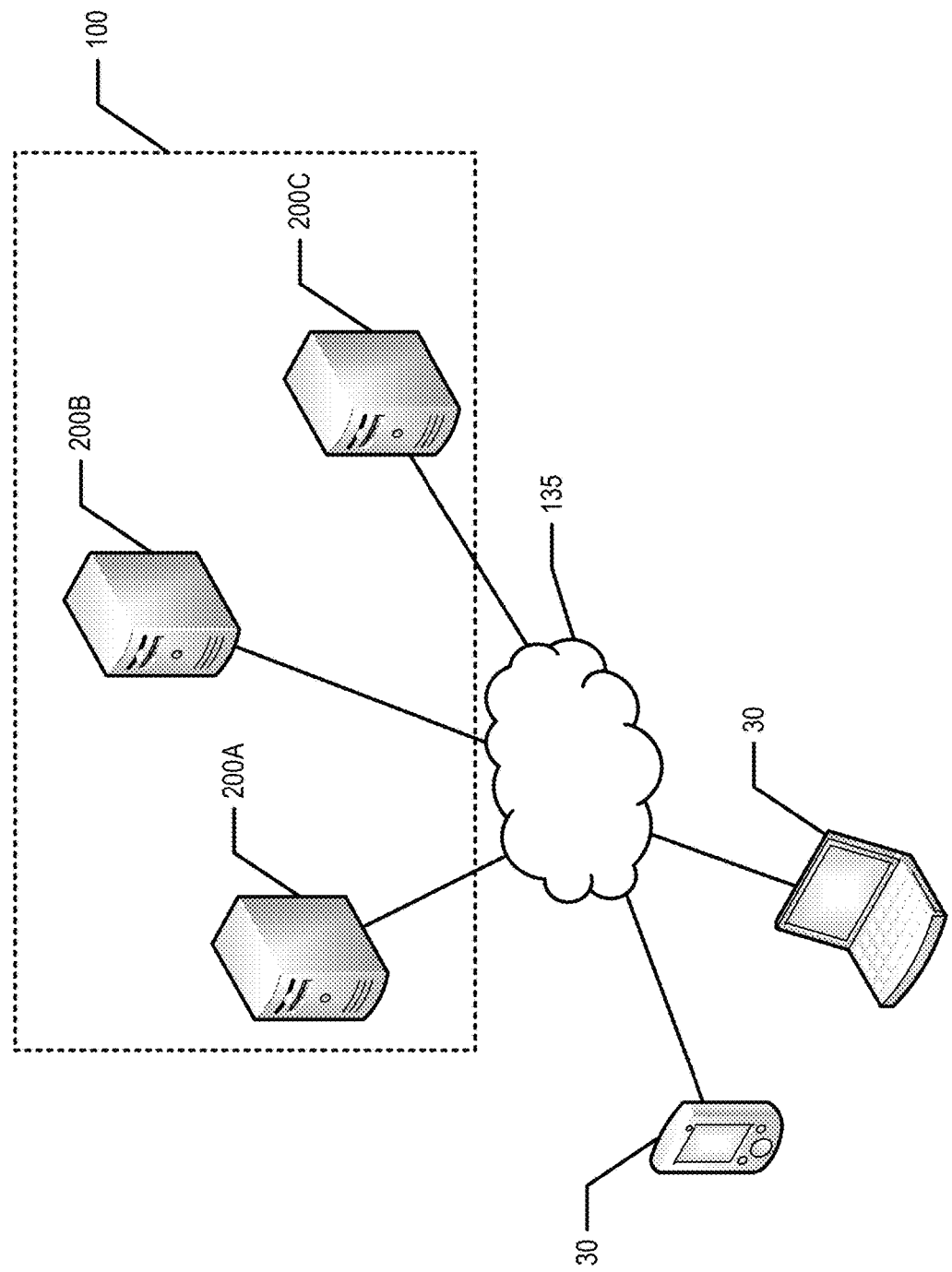
FIG. 1A is a diagram of a system that can be used to practice various embodiments of the present invention.
Figure 1B:
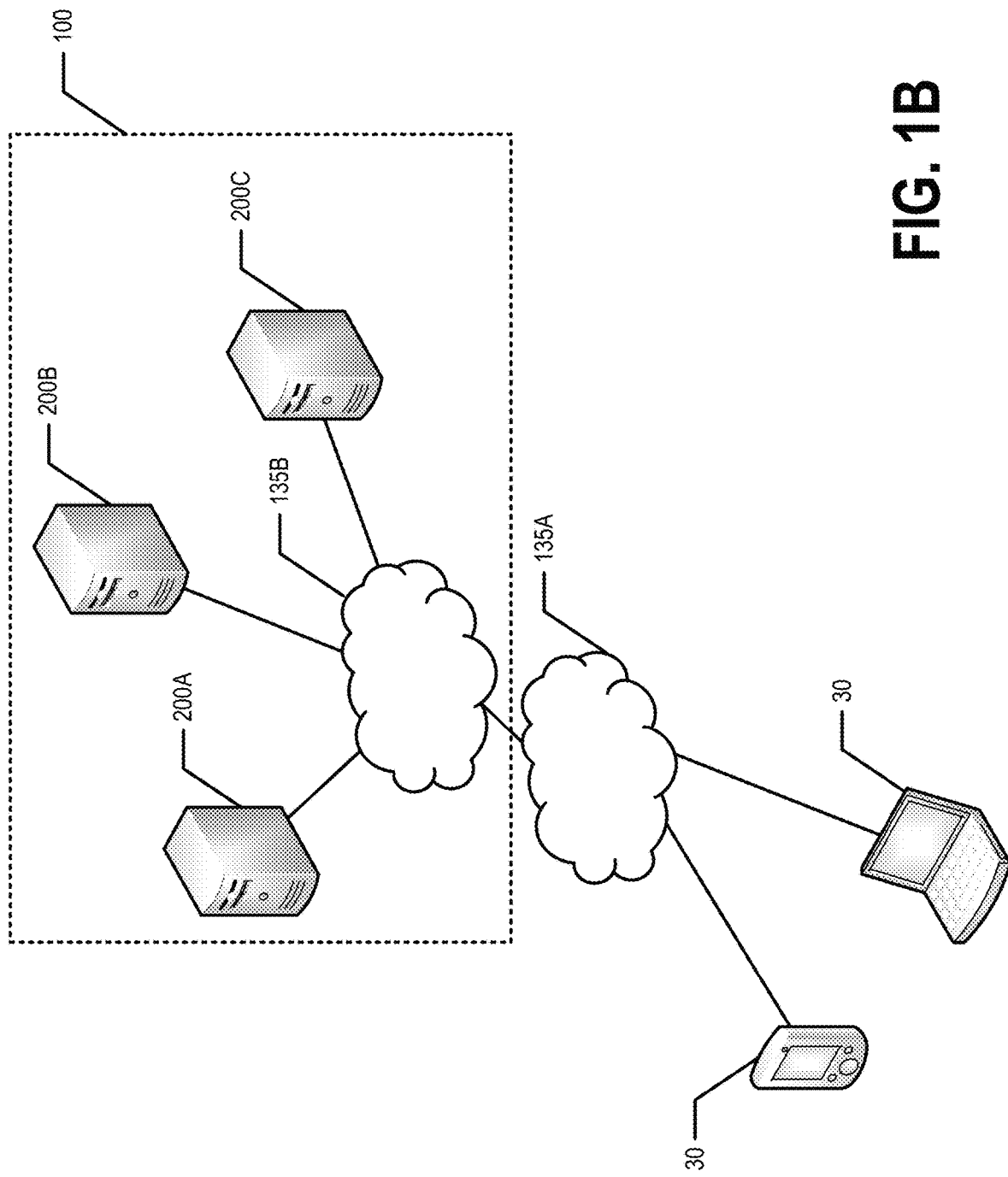
FIG. 1B is a diagram of another system that can be used to practice various embodiments of the present invention.

FIG. 1A provides an illustration of a system that can be used in conjunction with various embodiments of the present invention. As shown in FIG. 1A, the system may comprise a distributed system 100 comprising two or more node computing entities 200, 200'. As shown in FIG. 1A, the system may further comprise one or more user computing entities 30, one or more networks 135, and/or the like. FIG. 1B provides an illustration of another system that can be used in conjunction with various embodiments of the present invention. As shown in FIG. 1B, the system may comprise a distributed system 100 comprising two or more node computing entities 200, 200' and one or more internal networks 135B. For example, in an example embodiment, the distributed system 100 comprises a plurality of node computing entities 200, 200' in communication with one another via a network 135B that is a mesh network. As shown in FIG. 1B, the system may further comprise one or more user computing entities 30, one or more other and/or external networks 135A, and/or the like. For example, the other and/or external network 135A may be external and/or a different network from the internal and/or mesh network 135B. Each of the components of the system may be in electronic communication with, for example, one another over the same or different wireless or wired networks 135, 135A, 135B including, for example, a wired or wireless Personal Area Network (PAN), Local Area Network (LAN), Metropolitan Area Network (MAN), Wide Area Network (WAN), or the like. Additionally, while FIGS. 1A and/or 1B illustrate certain system entities as separate, standalone entities, the various embodiments are not limited to this particular architecture.

a. Exemplary Node Computing Entity

Figure 2:
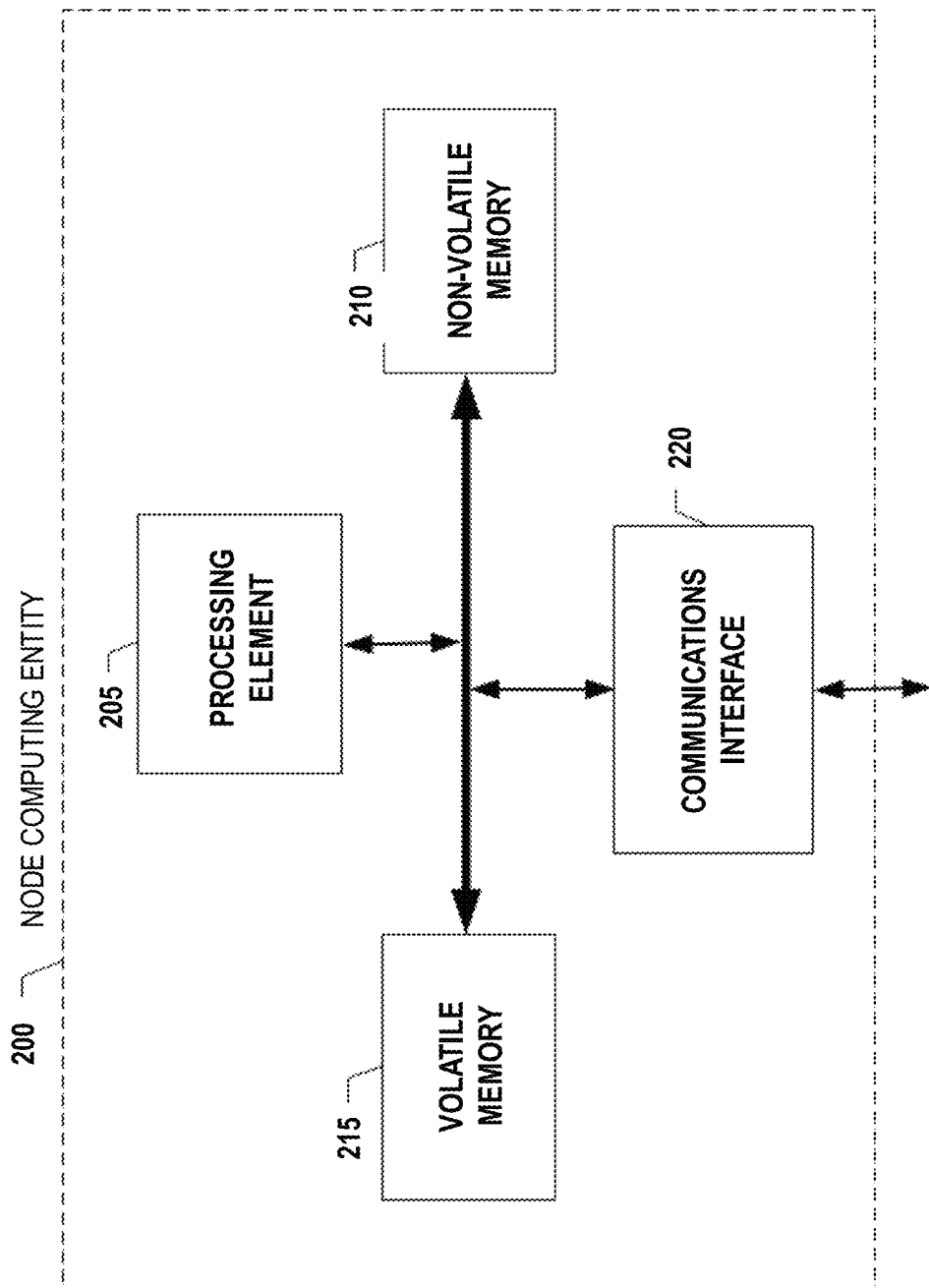
FIG. 2 is a schematic of a node computing entity in accordance with certain embodiments of the present invention.

FIG. 2 provides a schematic of a node computing entity 200 (e.g., 200A, 200B, 200C) according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the node computing entity 200 may also include one or more communications interfaces 220 for communicating with various computing entities, such as by communicating data, content, information, and/or similar terms used herein interchangeably that can be transmitted, received, operated on, processed, displayed, stored, and/or the like. For instance, the node computing entity 200 may communicate with other node computing entities 200, 200', one or more user computing entities 30, and/or the like.

As shown in FIG. 2, in one embodiment, the node computing entity 200 may include or be in communication with one or more processing elements 205 (also referred to as processors, processing circuitry, and/or similar terms used herein interchangeably) that communicate with other elements within the node computing entity 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the node computing entity 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the node computing entity 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the node computing entity 200 with the assistance of the processing element 205 and operating system.

As indicated, in one embodiment, the node computing entity 200 may also include one or more communications interfaces 220 for communicating with various computing entities, such as by communicating data, content, information, and/or similar terms used herein interchangeably that can be transmitted, received, operated on, processed, displayed, stored, and/or the like. For instance, the node computing entity 200 may communicate with computing entities or communication interfaces of other node computing entities 200, 200', and/or the like.

As indicated, in one embodiment, the node computing entity 200 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the node computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the node computing entity's 200 components may be located remotely from other node computing entity 200 components, such as in a distributed system. Furthermore, one or more of the components may be combined and additional components performing functions described herein may be included in the node computing entity 200. Thus, the node computing entity 200 can be adapted to accommodate a variety of needs and circumstances.

In example embodiments, the node computing entity 200 may be in communication with one or more other node computing entities 200, 200' and/or one or more user computing entities 30. In example embodiments, the node computing entity 200 may be in communication with one or more other node computing entities 200, 200' configured for executing, storing, managing, maintaining, and/or the like application program code corresponding to one or more trusted applications of a TA-NET and/or storing, maintaining, updating, accessing, and/or the like a secure ledger corresponding to the TA-NET.

b. Another Exemplary Node Computing Entity

Figure 3:
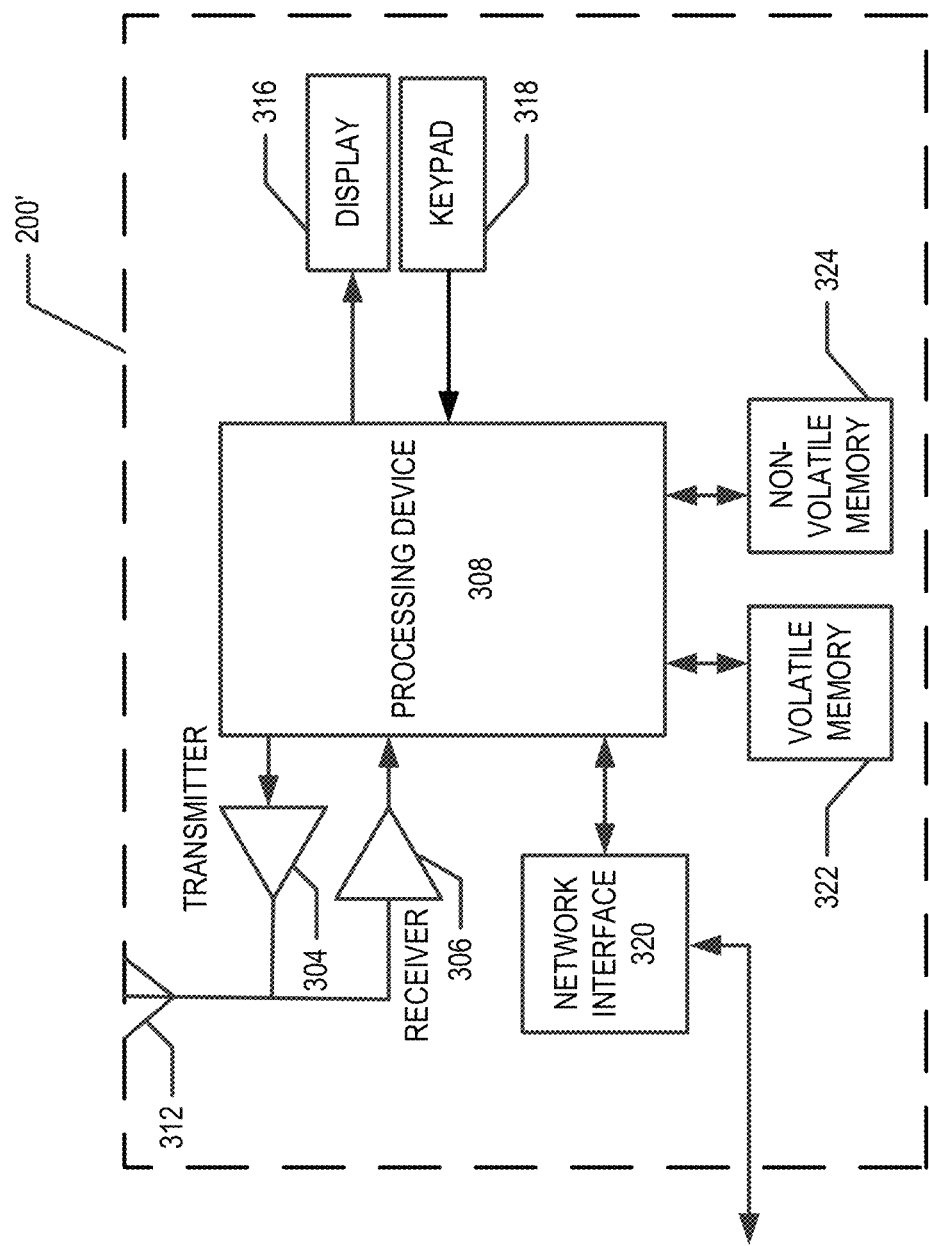
FIG. 3 is a schematic of another node computing entity in accordance with certain embodiments of the present invention.

FIG. 3 provides an illustrative schematic representative of a node computing entity 200' that can be used in conjunction with embodiments of the present invention. As shown in FIG. 3, a node computing entity 200' can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as another node computing entity 200, 200', one or more user computing entities 30, and/or the like. In this regard, the node computing entity 200' may be capable of operating with one or more air interface standards, communication protocols, modulation types, and access types. More particularly, the node computing entity 200' may operate in accordance with any of a number of wireless communication standards and protocols. In a particular embodiment, the node computing device 200' may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the node computing entity 200' can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The node computing entity 200' can also download changes, add-ons, and updates, for instance, to its firmware, software (e.g., including executable instructions, applications, program modules), and operating system.

According to one embodiment, the node computing entity 200' may include location determining aspects, devices, modules, functionalities, and/or similar words used herein interchangeably. For example, the node computing entity 200' may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the computing entity's 200' position in connection with a variety of other systems, including cellular towers, Wi-Fi access points, and/or the like. Similarly, the node computing entity 200' may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The node computing entity 200' may also comprise a user interface (that can include a display 316 coupled to a processing element 308) and/or a user input interface (coupled to a processing element 308). For example, the user interface may be an application, browser, user interface, dashboard, webpage, and/or similar words used herein interchangeably executing on and/or accessible via the node computing entity 200' to interact with and/or cause display of information. The user input interface can comprise any of a number of devices allowing the node computing entity 200' to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the node computing entity 200' and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the node computing entity 200' can collect contextual information/data, telemetry, information/data, and/or the like.

The node computing entity 200' can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the node computing entity 200'.

In example embodiments, the node computing entity 200' may be in communication with one or more other node computing entities 200, 200' and/or one or more user computing entities 30. In example embodiments, the node computing entity 200' may be in communication with one or more other node computing entities 200, 200' configured for executing, storing, managing, maintaining, and/or the like application program code corresponding to one or more trusted applications of a TA-NET and/or storing, maintaining, updating, accessing, and/or the like a secure ledger corresponding to the TA-NET.

c. Exemplary User Computing Entity

In an example embodiment, a user computing entity 30 may be a computing entity configured for user interaction (e.g., via a user interface thereof) for receiving, generating, and/or providing requests from a user to the distributed system. In various embodiments, a user may be a person interacting with a user computing entity 30 (e.g., via the user interface thereof) or a machine user (e.g., an application, service, and/or the like operating on the user computing entity 30). In various embodiments, the user computing entity may receive, generate, and/or provide requests to create or generate a TA-NET, add a node computing entity 200, 200' to an existing TA-NET, update a trusted application (e.g., the TA-SEC and/or the supplemental domain of a trusted application (TA-SUP)), execute and/or provide a function of a trusted application of the TA-NET, and/or the like.

In an example embodiment, a user computing entity 30 may be a node computing entity 200, 200'. For example, in an example embodiment, the user computing entity 30 may be a node of the distributed system 100. In an example embodiment, a user computing entity 30 is a lightweight node of the secure ledger (e.g., if the secure ledger is a distributed ledger). In another example embodiment, the user computing entity 30 is not a node of the secure ledger, but may communicate with one or more node computing entities 200, 200' via one or more wired or wireless networks 135. In one embodiment, the user computing entity 30 may include one or more components that are functionally similar to those of a node computing entity 200, 200'. For example, in one embodiment, a user computing entity 30 may include: (1) a processing element that communicates with other elements via a system interface or bus; (2) a user interface (e.g., display, touchscreen display, hard or soft keyboard, mouse, and/or the like); (3) transitory and non-transitory memory; and (4) a communications interface configured to communicate via one or more wired or wireless networks 135. For example, the user computing entity 30 may receive user input (e.g., via the user interface thereof) and provide (e.g. transmit) an indication of the user input to one or more node computing entities 200, 200' (e.g., via the communications interface).

d. Exemplary Networks

In one embodiment, any two or more of the illustrative components of the architecture of FIGS. 1A and/or 1B may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), metropolitan area networks (MANs), wide area networks (WANs), local area networks (LANs), or personal area networks. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

IV. EXEMPLARY SYSTEM OPERATION

Example embodiments provide a distributed system 100 that securely stores, accesses, uses, and/or processes confidential information/data (e.g., account numbers, credit card information/data, social security numbers, health information/data, financial transaction information/data, and/or other confidential information/data). In an example embodiment, this secure storage, access, use, and/or processing of confidential information/data is achieved through the use of one or more partitions (e.g., logical partitions, disk partitions, and/or the like) that define one or more trusted execution environments. In various embodiments, a trusted execution environment is a hardware feature of a processor (e.g., processing element 205, processing device 308), software feature, and/or combined hardware and/or software feature that guarantees that computer program code (e.g., application program code corresponding to a trusted application) and information/data loaded inside the trusted execution environment (e.g., information/data accessed from the secure ledger) to be protected with respect to confidentiality and integrity. In various embodiments, a trusted execution environment resides in an isolated area on a node computing entity 200, 200', maintained by the processor (e.g., processing element 205, processing device 308), to securely and verifiably restrict access to protected data and/or a trusted application. The trusted execution environment enables end users to interact and/or interface with a trusted application via APIs (e.g., secure API and/or supplemental API) where role-based access controls may be implemented.

In an example embodiment, the distributed system 100 uses a TA-NET and a corresponding secure ledger to achieve the secure storage, access, use, and/or processing of the confidential information/data. In an example embodiment, a TA-NET is a group of one or more trusted applications running on one or more node computing entities 200, 200' of a distributed system 100. In various embodiments, the TA-NET may be identified by a TA-NET name and/or identifier. The one or more trusted applications of the TA-NET can securely communicate to one or more other trusted applications of the TA-NET. The one or more trusted applications of the TA-NET have the ability to securely save, access, update and/or load data on a TA-Net specific data store (e.g., the secure ledger). In an example embodiment, the secure ledger corresponding to the TA-NET may enable secure communication of the one or more TA-HOSTS and/or one or more trusted applications of the TA-NET with one another. For example, as described in more detail elsewhere herein, access to at least portions of the secure ledger may be controlled via encryption keys (e.g., private/public keys, and/or the like). The use of these encryption keys may enable secure communication of the one or more TA-HOSTS, and/or one or more trusted applications of the TA-NET (e.g., the corresponding one or more TA-SEC), via the secure ledger. As should be understood, a distributed system 100 may comprise, operate, and/or maintain one or more TA-NETs. The one or more TA-NETs may be disposed on different and/or overlapping sets of node computing entities 200. For example, a particular node computing entity 200 may maintain multiple partitions that define multiple trusted execution environments each for use with a TA-NET. In another example embodiment, a particular node computing entity 200 may maintain one or more partitions that define a trusted execution environment for use with and/or by multiple TA-NETs.

In various embodiments, a trusted application is a service and/or the like provided via the execution of corresponding application program code (e.g., by the processor of a node computing entity 200, 200' (e.g., processing element 205, processing device 308)) that acts as the secure, trusted intermediary to run a business logic provided by the application program code (e.g., a smart contract and/or the like) that requires privacy, validation, integrity, access controls, and/or the like. In various embodiments, a trusted application is partitioned into two protection domains—a supplementary domain (e.g., TA-SUP) that is executed and/or operated by and/or within a normal operating system environment of the corresponding node computing entity 200, 200' and a secure domain (TA-SEC) that is executed and/or operated within the trusted execution environment of the corresponding node computing entity 200, 200'.

In various embodiments, a trusted application is accessible via a trusted application host (TA-HOST). In various embodiments, a TA-HOST is a service that executes, operates, and/or runs on a node computing entity 200, 200' (e.g., via the execution of computer program code corresponding to the TA-HOST by the processor of the node computing entity) which can host a trusted application and, optionally, other applications. In an example embodiment, a TA-HOST may be identified by a TA-HOST identifier. In various embodiments, the TA-HOST exposes and/or provides access to API functions of the corresponding trusted application to other services, applications, and/or the like of the node computing entity 200, 200' and/or other users (e.g., via communication with a user computing entity 30 via one or more networks 135).

As noted above, a trusted application may be partitioned into a TA-SUP and a TA-SEC. In an example embodiment, the TA-SUP may operate and/or be executed in a normal and/or traditional operating system and/or environment of the node computing entity 200, 200'. In an example embodiment, the TA-SUP may operate and/or be executed on standard hardware of a node computing entity 200, 200'. For example, the portion of the application program code corresponding to the TA-SUP may be installed, loaded, stored, and/or the like in a normal and/or traditional memory portion of the node computing entity 200, 200' and executed in the normal and/or traditional operating system and/or environment of the node computing entity 200, 200'. In example embodiments, the TA-SUP may be configured, programmed, and/or the like to perform and/or execute less sensitive features and/or activities. For example, the TA-SUP may be configured, programmed, and/or the like to serve information/data (e.g., non-confidential information/data, encrypted information/data, encrypted confidential information/data, information/data that has been pre-signed (e.g., within the TA-SEC and/or the like) to ensure integrity of the information/data, and/or the like), routing various calls to other applications and/or data sources (e.g., data sources storing non-confidential information/data and/or the like), transforming information/data, searching, application management, and/or the like.

In an example embodiment, the TA-SEC operates and/or is executed on a trusted execution environment of the corresponding node computing entity 200, 200'. For example, in an example embodiment, the application program code corresponding to the TA-SEC is installed, loaded, stored and/or the like in memory corresponding to the trusted execution environment and executed within the trusted execution environment. In an example embodiment, the application program code that, when executed by a processor of the node computing entity 200, 200' provides, generates, and/or the like the TA-SEC, is written in a language supported by the TA-HOST (e.g., JavaScript, and/or the like). The TA-SEC may store and/or have access to one or more keys used to sign/authenticate, encrypt, decrypt, and/or the like information/data, records, blocks, and/or the like. The TA-SEC keys are shared across appropriate TA-HOSTS (e.g., operating on various node computing entities 200, 200') and each TA-SEC has a shared public key that can be used by various users (e.g., users having the appropriate permissions and/or the like) to securely encrypt and/or send data to any node computing entity 200, 200' participating in the TA-NET corresponding to the trusted application.

The TA-SEC may be configured, programmed, and/or the like to store, access, update, and/or the like the secure ledger corresponding to the TA-NET. For example, a function of the distributed system and/or trusted application may be executed and/or performed within and/or by the TA-SEC in the trusted execution environment to generate a result. The TA-SEC may then cause the result to be stored to the secure ledger. For example, the TA-SEC may generate a proposed new entry (e.g., information/data, record, block, and/or the like) for inclusion in the secure ledger; manage, facilitate and/or the like the validation and/or consensus processing of the new entry by one or more node computing entities 200, 200' of the distributed system 100; and/or provide the new entry (possibly responsive to the new entry being validated and/or a positive outcome of the consensus processing) to the secure ledger. In an example embodiment, only TA-SECs of the TA-NET have access to the encryption keys required for reading or writing information/data, records, block, and/or the like from/to the secure ledger. For example, read and write access to the secure ledger may only be available through a TA-SEC of an application of the TA-NET (e.g., within the trusted execution environment).

In various embodiments, a secure ledger is a secure data repository corresponding to a TA-NET. For example, the secure ledger may be a data store and at least a portion of the information/data stored within the secure ledger is encrypted using a key corresponding to the TA-NET. In various embodiments, access to the secure ledger and/or the information/data, records, and/or blocks stored therein is controlled with public/private key encryption and/or another form of encryption. In an example embodiment, the secure ledger and/or the information/data, records, and/or blocks stored therein are only accessible by the secure sub-component of a trusted application (the TA-SEC) operating and/or executing within the trusted execution environment. Thus, information/data, records, blocks, and/or the like accessed from the secure ledger may be maintained, read, utilized, and/or the like in the trusted execution environment so as to not expose confidential information/data. In various embodiments, the secure ledger is a distributed ledger. In an example embodiment, a distributed ledger is a distributed data store such as, for example, a key/value pair, database, file, log, and/or other distributed data store and/or ledger. For example, in an example embodiment, the secure ledger is a blockchain database.

Figure 4:
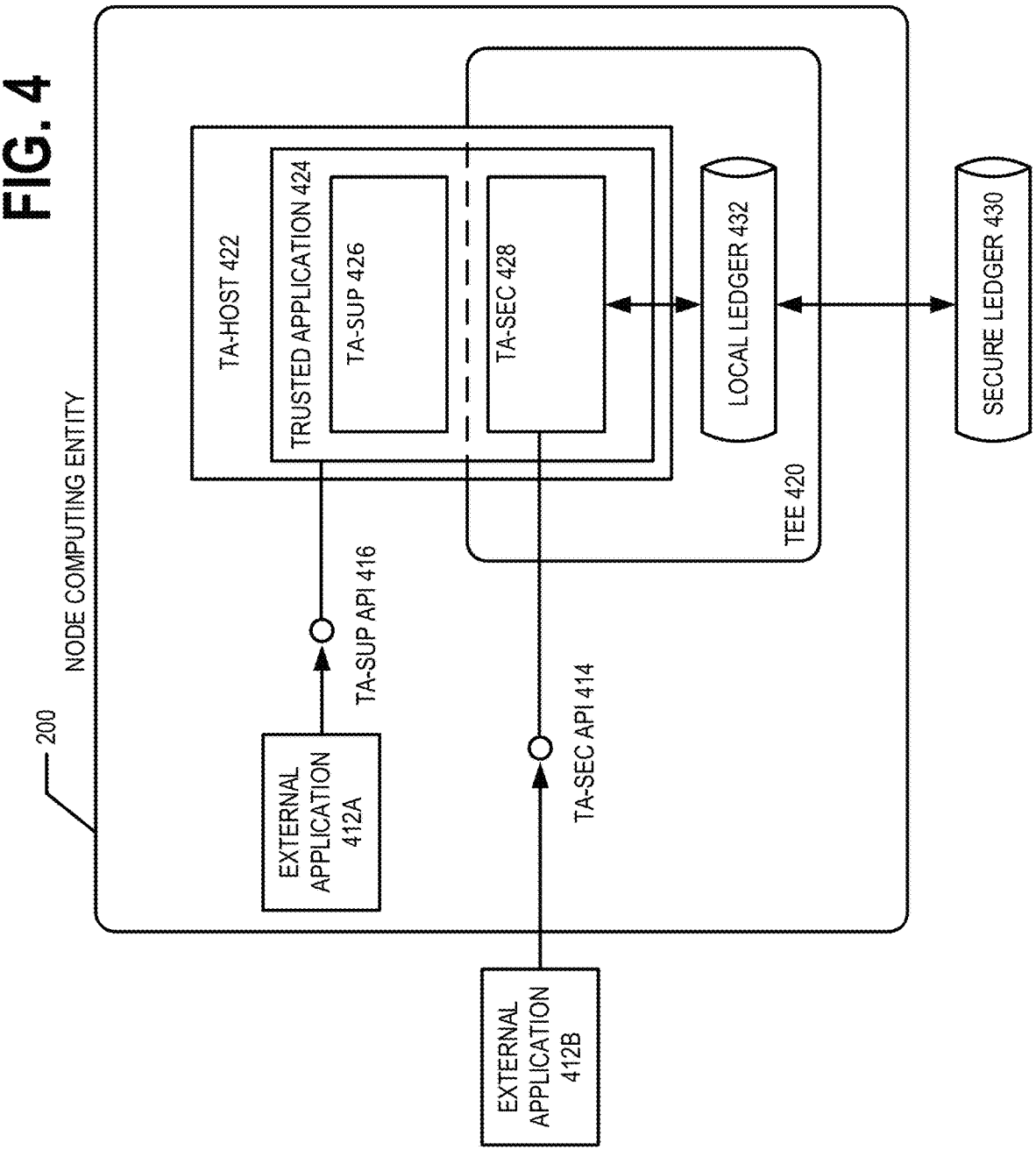
FIG. 4 is a block diagram illustrating an example system architecture, in accordance with an example embodiment of the present invention.

FIG. 4 provides a block diagram of an example node architecture, in accordance with an example embodiment of the present invention. For example, a processing element 205 of node computing entity 200 may execute program code stored in memory 210, 215 to generate, provide, and/or operate a TA-HOST 422. Within the TA-HOST 422, application program code of a trusted application 424 may be executed, operated, and/or the like to provide one or more functions for the distributed system 100. A supplemental portion (TA-SUP 426) of the trusted application 424 operates in a normal and/or traditional operating system and/or environment of the node computing entity 200. In an example embodiment, the application program code corresponding to the TA-SUP may operate and/or be executed on standard hardware of the node computing entity 200. A secure portion (TA-SEC 428) of the trusted application 424 operates in a trusted execution environment 420 provided, maintained, and/or the like by the processing element 205 of the node computing entity 200. For example, the portion of the application program code corresponding to the TA-SEC 428 may be stored, operated, and/or be executed in an isolated area of the node computing entity 200 termed the trusted execution environment 420 herein. In an example embodiment, one or more local ledger files 432 comprising one or more instances of information/data, records, blocks, and/or the like of the secure ledger may be stored by the node computing entity 200 (e.g., in memory 210, 215). In an example embodiment, the one or more local ledger files 432 are stored within the partition that defines the trusted execution environment 420 (e.g., in instances where the partition includes a disk partition of the memory 210, 215). The TA-SEC 428 is in communication with the secure ledger 430. For example, the TA-SEC 428 may execute read and/or write commands to the secure ledger 430 (e.g., via the local ledger files 432 in an embodiment where the secure ledger is a distributed ledger). In an example embodiment, the secure ledger 430 is stored by one or more node computing entities 200, 200' of the distributed system 100 and/or in computer-readable memory accessible to one or more node computing entities 200, 200' (e.g., via network 135, 135B). In some embodiments, the secure ledger 430 is a distributed ledger and the node computing entity 200 may be a node of the secure ledger 430. For example, the node computing entity 200 may store a copy and/or instance of the secure ledger 430 in the local ledger files 432. As illustrated, the secure ledger 430 is accessible for read and write operations through the TA-SEC 428 of a trusted application 424 of the TA-NET corresponding to the secure ledger 430.

As described above, the TA-HOST 422 provides access to the trusted application 424 and the TA-SEC 428 via one or more APIs. In an example embodiment, an external program 412a operating on the node computing entity 200 and/or an external program 412b operating on another node computing entity 200 and/or a user computing entity 30 may communicate, provide requests, receive information/data, and/or the like with the trusted application 424 through one or more APIs that are exposed via the TA-HOST 422. In an example embodiment, the TA-HOST 422 may enable external programs 412a, 412b to create, read, use, delete, request operation of a distributed system function (e.g., processing a transaction and/or action, processing provided information/data for validation purposes, adding/writing the information/data and/or transaction and/or action result in the secure ledger 430, etc.) and/or the like corresponding to the trusted application 424 via one or more APIs. For example, an external application 412a operating on the node computing entity 200 may communicate, provide requests, and/or receive information/data from the trusted application 424 via a supplemental API (TA-SUP API) 416 exposed by the TA-HOST 422. For example, the TA-SUP API 416 may provide access to the TA-SUP 426 (which may in turn communicate with the TA-SEC 428). In another example, the external application 412b operating on a different node computing entity 200, 200' and/or user computing entity 30 may communicate, provide requests, and/or receive information/data from the trusted application 424 via a secure API (TA-SEC API) 414. For example, the TA-SEC API 418 may permit communication with the TA-SEC 428 operating within the trusted execution environment. In various embodiments, the TA-SEC 414 may use one or more public/private keys to control, secure, enable, and/or the like communication between the TA-SEC 428 and the user computing entity 30. In various embodiments, an external application 412a, 412b is an application that is not a trusted application or that is not a trusted application of the same TA-NET as the trusted application 424. Thus, a user operating a user computing entity 30 (e.g., a human user interacting with the user computing entity 30 via a user interface or a machine user (e.g., an application, service, and/or the like operating on the user computing entity 30) may provide requests to and receive information/data from the trusted application 424 and/or secure ledger 430 via the TA-SUP API 416 and/or TA-SEC API 414. In an example embodiment, an external application 412b operating on a different node computing entity 200, 200' and/or user computing entity 30 may interface and/or communicate with the trusted application via a TA-SUP API 416 and/or an external application 412a operating on the same node computing entity 200, 200' may interface and/or communicate with the trusted application 424 via a TA-SEC API 414. The TA-SUP API 416 and TA-SEC API 414 enable the trusted application 424 to receive information/data and requests and provide information/data while maintaining the isolation of the TA-SEC 428 within the trusted execution environment 420.

In an example embodiment, a TA-HOST 422 and/or trusted application 424 may securely store (e.g., within the trusted execution environment and/or the like) and/or have access to a private and/or signing key for signing information/data provided by the TA-HOST 422 and/or trusted application 424 to external applications 412a, 412b via the TA-SEC API 414 and/or TA-SUP API 416 and/or for signing entries written to the secure ledger 430 by the TA-HOST 422 and/or trusted application 424. A corresponding public and/or authenticating key may be used by another application, service, computing entity, and/or the like to authenticate information/data and/or entries provided by the TA-HOST 422 and/or secure application 424.

Various example elements of operation of an example distributed system 100 will now be described with reference to FIGS. 5-8.

a. Creating a TA-NET

In various embodiments, one or more TA-NETs may be generated, created, and/or the like that encompass one or more node computing entities 200, 200'. Each TA-NET may correspond to one or more trusted applications 424 that are configured and/or programmed to communicate with one another using the appropriate encryption keys. FIG. 5 provides a data flow diagram illustrating an example process for generating a TA-NET comprising and/or corresponding to one or more trusted applications 424.

Starting at 502, a user (e.g., human user interacting with a user computing entity 30 via a user interface and/or machine user) may operate a user computing entity 30 to provide (e.g., transmit) a TA-NET request. In an example embodiment, a TA-NET request may comprise a name and/or identifier for use in identifying the TA-NET to be created and/or generated, one or more parameters and/or properties of the TA-NET to be generated (e.g., types of encryption to be used, type and/or protocols of a corresponding secure ledger to be generated, and/or the like). The TA-NET request may further comprise one or more user identifiers identifying one or more users and/or user accounts that are authorized to perform administrative functions on the TA-NET. In an example embodiment the users and/or user accounts authorized to perform administrative functions may be permitted to call one or more administrative functions on the TA-NET. The node computing entity 200 may receive the TA-NET request (e.g., via the communications interface 220). In an example embodiment, before processing the TA-NET request, the node computing entity 200 may operate the TA-HOST 422 to attest that the TA-HOST 422 is operating and/or executing on genuine hardware in a secure environment. For example, the TA-HOST 422 may attest that it is operating on hardware that supports the creation, generation, and/or use of one or more partitions for generating and/or maintaining a trusted execution environment. In an example embodiment, the attestation may further comprise determining that the attestation functionality of the TA-HOST 422 is enabled and online. In an example embodiment, receipt of the TA-NET request by the node computing entity 200 may, in effect, be an attestation request. In an example embodiment, a separate attestation request may be provided by the user computing entity 30 and/or received by the node computing entity 200 prior to the providing and receipt of the TA-NET request.

At 504, the node computing entity 200 may execute the TA-HOST 422 to perform the attestation. For example, the processing element 205 may execute program code corresponding to and/or programmed to provide the TA-HOST 422 to perform the attestation. In an example embodiment, the attestation may comprise certifying that the hardware of the node computing entity 200 is capable of maintaining a trusted execution environment 420, that one or more partitions are in place that define the trusted execution environment 420, the TA-HOST 422, and/or the like. In an example embodiment, a public key corresponding to one or more hardware elements of the node computing entity 200 (e.g., one or more computer chips corresponding to the processing element 205, memory 210, 215, and/or the like) may be used to perform the attestation. For example, a public key corresponding to one or more hardware elements of the node computing entity 200 may be used to ensure the hardware elements' compliance with trusted computing standards and/or to prove the identity of the one or more hardware elements. For example, a certified attestation identity key (possibly provided by a third party) may be used to perform the attestation. For example, the attestation may be performed using a remote attestation, direct anonymous attestation, or other attestation process.

At 506, the node computing entity 200 may provide (e.g., transmit) a result of performing the attestation. For example, the communications interface 220 may provide a result of performing the attestation. The user computing entity 30 may receive the result of performing the attestation. For example, a communication interface of the user computing entity 30 may receive the result of performing the attestation. Responsive to processing the result of the attestation, if the result is a positive result, the user computing entity 30 may provide (e.g., transmit) the TA-NET request and/or an instruction/request for processing of the TA-NET request, at 508. As should be understood, the result of the attestation is a positive result if the confirmation(s) and/or certification(s) of the node computing entity 200, trusted execution environment 420, TA-HOST 422, and/or the like are in accordance with attestation standards for the TA-NET. If the result of the attestation result is not a positive result, a notification may be provided to the user via the user computing entity 30, the process may be ended, and/or the like. For example, the node computing entity 200 may receive (e.g., via the communications interface 220) the TA-NET request and/or an instruction/request for processing of the TA-NET request.

At 510, the node computing entity 200 may create and/or generate the TA-NET. For example, the node computing entity 200 may create and/or generate a TA-NET identified by the name and/or identifier provided in the TA-NET request and in accordance with the one or more parameters and/or properties provided in the TA-NET request. In an example embodiment, creation and/or generation of the TA-NET comprises generating and/or defining the TA-NET name and/or network identifier, authorized administrative users, shareable and/or shared resources of the TA-NET (e.g., shared directories, the secure ledger, discovery service, applications, and/or the like), encryption keys for accessing the shared resources, and/or the like. For example, a secured shared resource may be (or at least portions of secured shared resource) may be encrypted such that applications of the TA-NET have access thereto but other computing entities (e.g., user computing entity 30) does not. In an example embodiment, a portion of a secured shared resource may be public and/or accessible via the user computing entity 30, and/or the like while another portion of the secured shared resource is encrypted to prevent public access thereto. In an example embodiment, the creation of the TA-NET includes generating the secure ledger 430 corresponding to the TA-NET. In an example embodiment, the secure ledger 430 is generated based on and/or in accordance with the one or more parameters and/or properties provided in the TA-NET request. At 512, the administrative users and/or user accounts for the TA-NET are assigned. For example, based on the user identifiers provided as part of the TA-NET request, one or more users and/or user accounts may be assigned user permissions corresponding to administrative functions and/or other functions of the TA-NET. For example, the node computing entity may assign user permissions corresponding to administrative functions of the TA-NET to the users and/or user accounts identified by the user identifiers provided in the TA-NET request. In an example embodiment, the user identifiers identifying the users and/or user accounts having permissions corresponding to administrative functions may be stored in the secure ledger 430 corresponding to the TA-NET.

At 514, the node computing entity 220 may provide (e.g., transmit via the communications interface 220) a confirmation that the TA-NET has been created. The user computing entity 30 may receive the confirmation that the TA-NET has been created. At some point after receiving the confirmation that the TA-NET has been created (or possibly responsive thereto), the user computing entity 30 may provide (e.g., transmit and/or otherwise provide) application program code and/or otherwise create and/or generate a trusted application 424 of the TA-NET, at 516. For example, the node computing entity 220 may receive application program code corresponding to a trusted application 424 of the TA-NET. For example, the node computing entity 200 may receive the application program code via the communications interface 220, via a non-transitory computer readable medium (e.g., compact disc, thumb drive, floppy disc, and/or the like) and/or the like. The node computing entity 200 may store the application program code in memory 210, 215, process and/or install the application program code, and/or the like.

At 518, responsive to receiving the application program code corresponding to trusted application 424 and/or installing/processing the application program code corresponding to trusted application 424, the node computing entity 200 generates one or more public/private key pairs and/or other encryption keys for use by/with the corresponding trusted application 424. For example, the TA-HOST 422 may operate and/or be executed to generate a public key to be used when communicating with the trusted application 424 and a private key for use by the trusted application 424 (e.g., as a signing key). In an example embodiment, the TEE 420 may generate one or more public/private key pairs and/or other encryption keys such that the TEE 420 may be accessible via and/or to the TA-NET. In an example embodiment, the one or more keys may include an encryption code for encoding information/data written to the secure ledger 430 and/or for decrypting information/data read from the secure ledger 430. In an example embodiment, the one or more keys may be generated based on and/or in accordance with the one or more parameters and/or properties provided in the TA-NET request. As should be understood, the generated keys are stored in appropriate locations. In various embodiments, at least some of the generated keys are used by the TA-SEC 428 on a first node computing entity 200A to communicate with other TA-SEC 428 instances (e.g., on second and third node computing entities 200B, 200C and/or corresponding to other trusted applications in the TA-NET) and to access the secure ledger 430 and/or other secured shared resources of the TA-NET.

At 520, the secure portion and/or secure domain (TA-SEC 428) of the trusted application 424 is generated. For example, the node computing entity 200 may operate and/or execute the TA-HOST 422 to generate and/or create the TA-SEC 428 within the trusted execution environment 420. For example, the application program code corresponding to the TA-SEC 428 may be loaded and/or installed into the trusted execution environment 420. In an example embodiment, the application program code corresponding to the TA-SEC 428 may comprise program code corresponding to one or more smart contracts. For example, the TA-SEC 428 may be configured and/or programmed to execute program code corresponding to one or more smart contracts. In an example embodiment, the application program code or at least the portion of the application program code corresponding to the TA-SEC 428 may be written to the secure ledger 430.

As should be understood, a plurality of trusted applications 424 of the TA-NET may be generated, created, and/or the like through the provision and/or generation of application program code for each of the trusted applications 424 to the TA-HOST 422 operating and/or executing on the node computing entity 200. The application program code corresponding to a trusted application 424 may be populated to multiple node computing entities 200 of the distributed system 100 such that TA-SECs 428 of the trusted application 424 may be generated on multiple node computing entities 200. In an example embodiment, the distribution of the application program code corresponding to the trusted application 424 and/or the portion of the application program code corresponding to the TA-SEC 428 may be controlled and/or enabled via the secure ledger 430.

b. Adding a Node to a TA-NET

In various embodiments, a second node computing entity 200B may be added to a distributed system 100 and/or to a TA-NET. FIG. 6 provides a data flow diagram of a process of adding a second node computing entity 200B to an existing distributed system 100 and/or TA-NET. The existing distributed system 100 and/or TA-NET may already comprise and/or correspond to one or more first node computing entities 200A.

Starting at 602, an add node request is provided by a user computing entity 30. For example, a user (e.g., human user interacting with a user computing entity 30 via a user interface and/or machine user) may operate a user computing entity 30 to provide (e.g., transmit) an add node request. In an example embodiment, the user is a user or user account having permissions allowing the user to perform and/or call administrative functions on the TA-NET. The second TA-HOST 422B operating on and/or executed by the second node computing entity 200B may receive (e.g., via communications interface 220) the add node request. In an example embodiment, the add node request may comprise a name and/or identifier configured to identify the TA-NET, a TA-HOST identifier identifying the second TA-HOST 422B to be added to the TA-NET, and/or the like. In an example embodiment, the add node request may comprise one or more public keys for communicating with the first TA-HOST 422A operating on and/or executed by the first node computing entity 200A and/or one or more trusted applications 424 of the TA-NET. The second TA-HOST 422B may process the add node request and, responsive thereto, provide an add me request to the first TA-HOST 422A. For example, the second node computing entity 200B may provide an add me request comprising the name and/or identifier for the TA-NET, the TA-HOST identifier for the second TA-HOST 422B, and/or the like. In an example embodiment, the add me request may be encrypted using one or more public keys provided in the add node request.

The first TA-HOST 422A operating and/or executing on the first node computing entity 200A may receive the add me request (e.g., via the communications interface 220). Responsive thereto, the first TA-HOST 422A may provide (e.g., transmit via the communications interface 220 of the first node computing entity 200A) an attestation request to the second TA-HOST 422 operating and/or executing on the second node computing entity 200B. In an example embodiment, the second node computing entity 200B, responsive to receiving the attestation request (e.g., via the communications interface 220), may operate and/or execute the second TA-HOST 422B to attest that the second TA-HOST 422B is operating and/or executing on genuine hardware in a secure environment responsive to receiving the attestation request (e.g., via the communications interface 220 of the second node computing entity 200B). For example, the second TA-HOST 422B may attest that it is operating on hardware that supports the creation, generation, and/or use of one or more partitions for generating and/or maintaining a trusted execution environment.

At 608, the second node computing entity 200B may execute the second TA-HOST 422B to perform the attestation. For example, the processing element 205 of the second node computing entity 200B may execute program code corresponding to and/or programmed to provide the second TA-HOST 422B to perform the attestation. In an example embodiment, the attestation may comprise certifying that the hardware of the second node computing entity 200B is capable of maintaining a trusted execution environment 420B, that one or more partitions are in place that define the trusted execution environment 420B, the TA-HOST identifier of the add me request matches the identity of the second TA-HOST 422B, and/or the like. In an example embodiment, a public key corresponding to one or more hardware elements of the second node computing entity 200B (e.g., one or more computer chips corresponding to the processing element 205, memory 210, 215, and/or the like) may be used to perform the attestation. For example, a public key corresponding to one or more hardware elements of the second node computing entity 200B may be used to ensure the hardware elements' compliance with trusted computing standards and/or to prove the identity of the one or more hardware elements. For example, a certified attestation identity key (possibly provided by a third party) may be used to perform the attestation. For example, the attestation may be performed using a remote attestation, direct anonymous attestation, or other attestation process.

At 610, the second node computing entity 200B (e.g., the second TA-HOST 422B) may provide (e.g., transmit) a result of performing the attestation. For example, the second TA-HOST 422B may instruct the communications interface 220 of the second node computing entity 200B to provide a result of performing the attestation. The first node computing entity 200A may receive (e.g., via the corresponding communications interface 220) the result of performing the attestation. In response to processing the result of performing the attestation (e.g., by the processing element 205), if the result is a positive result, the first node computing entity 200A may provide (e.g., transmit via the corresponding communications interface 220) an approval message at 612. If the result of the attestation result is not a positive result, a notification may be provided to the user via the user computing entity 30, the process may be ended, and/or the like.

The second node computing entity 200B may receive the approval message (e.g., via the corresponding communications interface 220). In an example embodiment, the approval message may comprise one or more keys required for accessing the secure ledger 430. For example, the approval message may comprise one or more private and/or public keys used to read from, write to, and/or otherwise access the secure ledger 430. In an example embodiment, the approval message may comprise one or more keys (e.g., public and/or private keys) that may be used by the second node computing entity 200B to join the TA-NET. In an example embodiment, the approval message may comprise one or more keys (e.g., public keys) that may be used to authenticate the identity of an entity (e.g., TA-HOST 422, TA-SEC 428, node computing entity 200, and/or the like) that has written an entry (e.g., an instance of information/data and/or a record, block, and/or the like) to the secure ledger 430. In an example embodiment, the approval message may comprise one or more keys (e.g., private keys) for use by the second TA-HOST 422B, TA-SEC 428B, and/or second node computing entity 200B to sign entries (e.g., instances of information/data and/or records, blocks, and/or the like) written to the secure ledger 430 by the second TA-HOST 422B, TA-SEC 428B, and/or second node computing entity 200B. In an example embodiment, the approval message may comprise one or more keys for encrypting entries (e.g., instances of information/data and/or records, blocks, and/or the like) written to the secure ledger 430 by the second TA-HOST 422B, TA-SEC 428B, and/or second node computing entity 200B and/or decrypting entries and/or portions thereof (e.g., instances of information/data and/or records, blocks, and/or the like) read, gotten, and/or accessed from the secure ledger 430 by the second TA-HOST 422B, TA-SEC 428B, and/or second node computing entity 200B In an example embodiment, the keys provided by the approval message may be stored by the second TA-HOST 422B within the trusted execution environment 420B and/or in a location accessible to the TA-SEC 428.

In an example embodiment, the second node computing entity 200B, responsive to second node computing 200B processing the approval message (e.g., by the processing element 205), the second node computing entity 200B may provide an approved message to the user computing entity 30 confirming that the second node computing entity 200B (e.g., the second TA-HOST 422B) has been approved for inclusion in the TA-NET at 614. For example, the second node computing entity 200B may provide (e.g., transmit via the corresponding communications interface 220) an approved message confirming the addition of the second TA-HOST 422B to the TA-NET. The user computing entity 30 may receive the approved message (e.g., via a corresponding communications interface), process the approved message (e.g., via the processing element 205), and provide an indication of the approval of the second node computing entity 200B and/or the second TA-HOST 422B to the user (e.g., via a user interface in the case of a human user or via an API or other appropriate message/mechanism in the case of a machine user).

In an example embodiment, responsive to the second node computing entity 200B processing the approval message (e.g., by the processing element 205 and/or via the second TA-HOST 422B), the TA-HOST 422B may create the secure portion and/or domain of one or more trusted applications 424 of the TA-NET at 616. For example, the TA-HOST 422B may create and/or generate the TA-SEC 428B of one or more trusted applications 424 within the trusted secure environment 420B. For example the second TA-HOST 422B (e.g., executed and/or operating in the trusted execution environment) may access the secure ledger 430 (e.g., using one or more keys received in the approval message) to request and receive (e.g., read and/or get) information/data and/or one or more records, blocks, and/or the like to obtain application program code for one or more trusted applications 424. For example, the second TA-HOST 422B may access the secure ledger 430 to access and/or read one or more application program code of one or more trusted applications 424 of the TA-HOST, at 618. In an example embodiment, the application program code may comprise one or more smart contracts, one or more smart contract transactions, and/or the like. For example, the trusted application 424 may comprise a smart contract and the second TA-HOST 422B may access the secure ledger 430 to read, get, and/or the like one or more smart contract transactions corresponding to the trusted application 424.

In an example embodiment, the second TA-HOST 422B may download and/or read application program code corresponding to the trusted application 424, and possibly comprising one or more smart contracts, from the secure ledger 430 at 620. In an example embodiment, the application program code obtained from the secure ledger 430 may be the complete application program code for the trusted application 424. In an example embodiment, the application program code obtained from the secure ledger 430 may comprise the application program code corresponding to the TA-SEC 428B. In an example embodiment, the second TA-HOST 422B may install the application program code obtained from the secure ledger 430 such that the application program code corresponding to the TA-SEC 428B is loaded, installed, and/or stored in the trusted execution environment 420B. If the secure ledger 430 is a distributed ledger, the second TA-HOST 422B may also generate one or more local ledger files 432 based on entries (e.g., instances of information/data and/or one or more records, blocks, and/or the like) read from the secure ledger 430.

c. Updating a TA-SEC

In an example embodiment, an existing TA-SEC 428 may be updated in place. For example, a TA-NET may exist that is operating a TA-SEC 428 of a trusted application 424 on one or more node computing entities 200. A user computing entity 30 may submit an update to the TA-SEC 428 and/or an updated version of the TA-SEC 428 to a first node computing entity 200A. The first node computing entity 200A may validate, attest, and/or confirm authorization of the update to the TA-SEC 428 and/or updated version of the TA-SEC 428 and the update to the TA-SEC 428 and/or updated version of the TA-SEC 428 may be distributed and/or populated to one or more second node computing entities 200B, for example, via the secure ledger 430. In an example embodiment, the name and/or identifier of the TA-NET is not affected by the update to the TA-SEC 428 and/or the updated version of the TA-SEC 428. FIG. 7 provides a data flow diagram illustrating an example process for updating an existing TA-SEC 428.

Starting at 702, a user operating a user computing entity 30 (e.g., a human user interacting with a user interface and/or a machine user) may provide, submit, and/or the like an update. For example, the update may comprise an update to application program code corresponding to a trusted application 424 or a new version of the application program code corresponding to the trusted application 424. In an example embodiment, the update may comprise one or more system requirements for a trusted execution environment 420, hardware of a node computing entity 200, program code of a TA-HOST 422 and/or the like required for a node computing entity 200 and/or TA-HOST 422 to operate and/or execute the trusted application 424 as updated, implemented, and/or the like by the update. For example, the update may comprise one or more system requirements that a node computing entity 200, TA-HOST 422, and/or the like should meet in order to implement the update. The user computing entity 30 may provide (e.g., transmit) the update. In an example embodiment, a first node computing entity 200A may receive the update (e.g., via the corresponding communications interface 220).

Responsive to receiving the update, the first node computing entity 200A may operate and/or execute the first TA-HOST 422A to perform an attestation of the update and/or the first TA-HOST 422A at 704. For example, the first TA-HOST 422A may confirm, certify, and/or the like that the update is encoded using an appropriate encryption key, signed with an authorized signatory key, and/or otherwise confirm that the update is provided by an authorized entity and is authentic (e.g., has not been modified since the update was provided by the authorized entity). In an example embodiment, the first TA-HOST 422A may perform an attestation of the first TA-HOST 422A, first node computing entity 200A, and/or the like to confirm and/or certify that the hardware of the first node computing entity 200A is capable of maintaining a trusted execution environment 420A in accordance with any system requirements of the update, that one or more partitions are in place that define the trusted execution environment 420A, the first TA-HOST 422A, and/or the like in accordance with any system requirements of the update, and/or the like. In an example embodiment, a public key corresponding to one or more hardware elements of the first node computing entity 200A (e.g., one or more computer chips corresponding to the processing element 205, memory 210, 215, and/or the like) may be used to perform the attestation. For example, a public key corresponding to one or more hardware elements of the first node computing entity 200A may be used to ensure the hardware elements' compliance with trusted computing standards, to ensure hardware elements' and/or program code of the first TA-HOST's 422A compliance with the system requirements of the update, and/or to prove the identity of the one or more hardware elements. For example, a certified attestation identity key (possibly provided by a third party) may be used to perform the attestation. For example, the attestation may be performed using a remote attestation, direct anonymous attestation, or other attestation process.

At 706, responsive to a positive result from performing the attestation of the update and/or the first node computing entity 200A, first TA-HOST 422A, the trusted execution environment 420A, and/or the like, the first TA-SEC 428A may be updated based on the update. For example, the application program code provided by the update may be used to update the first TA-SEC 428A. For example, the first TA-HOST 422A may cause the installed application program code corresponding to the trusted application 424 and/or the first TA-SEC 428A to be updated based on the application program code provided by the update. In an example embodiment, the first TA-HOST 422A may cause the installed application program code corresponding to the trusted application 424 and/or the first TA-SEC 428A to be uninstalled and the new version of the application program code corresponding to the trusted application 424 and/or the first TA-SEC 428A provided by the update to be installed (e.g., in the trusted execution environment 420A). If the result of the attestation result is not a positive result, a notification may be provided to the user via the user computing entity 30, the process may be ended, and/or the like.

At 708, the first TA-HOST 422A, first TA-SEC 428A, and/or the like may write the update and/or a portion thereof (e.g., any provided system requirements, the provided application program code, and/or the like) as a new entry to the secure ledger 430. For example, the first TA-HOST 422A, first TA-SEC 428A, and/or the like may encrypt, sign, and/or the like at least a portion of the update and provide (e.g., write) the encrypted, signed, and/or the like at least a portion of the update to the secure ledger 430. In an example embodiment, the at least a portion of the update is encrypted, signed, and/or the like using one or more keys particular to the TA-NET, the first TA-HOST 422A, the first TA-SEC 428A, and/or the like. For example, the first TA-HOST 422A may sign the at least a portion of the update provided to the secure ledger 430 using a private key and/or signatory key corresponding to the TA-HOST 422A. For example, the TA-HOST 422A may encrypt the at least a portion of the update provided as a new entry to the secure ledger 430 using an encryption code particular to the TA-NET. Thus, an encrypted new entry (e.g., information/data and/or a record, block, and/or the like) comprising at least a portion of the update may be stored, written, and/or the like to the secure ledger 430. As described above, in an example embodiment, the application program code corresponding to a TA-SEC 428 may comprise one or more smart contracts. Thus, in an example embodiment, one or more smart contracts executed, operated, and/or the like via the distributed system 100 may be updated in a secure, trusted, authenticatable, and trackable manner.

At 710, a second TA-HOST 428B of the one or more second TA-HOSTS 422B may request the entry (e.g., instance of information/data and/or record, block, and/or the like) comprising the at least a portion of the update from the secure ledger 430 (e.g., via a get or read command issued to the secure ledger 430). For example, the second TA-HOST 422B may request the entry (e.g., instance of information/data and/or record, block, and/or the like) responsive to detecting, identifying, and/or determining that the entry has been added to the secure ledger 430. In an example embodiment, the second TA-HOST 422B may periodically and/or regularly request entries (e.g., instances of information/data and/or records, blocks and/or the like) written to the secure ledger 430 since the previous read and/or get request was submitted to the secure ledger 420 by the TA-HOST 422B. In another example, the first TA-HOST 422A may provide (e.g., transmit) a notification via the TA-NET and/or the like regarding the update of the TA-SEC 428A based on the update. In an example embodiment, such a notification may be provided and/or disseminated via the secure ledger 430.

At 712, responsive to receiving a notification regarding the update and/or identifying an instance of information/data and/or record, block, and/or the like read from the secure ledger 430 that comprises the at least a portion of the update, the second node computing entity 200B may operate and/or execute the second TA-HOST 422B to perform an attestation of the update and/or the second TA-HOST 422B. For example, the second TA-HOST 422B may confirm, certify, and/or the like that the update is encoded using an appropriate encryption key, signed with an authorized signatory key, and/or otherwise confirm that the update is provided by an authorized entity and is authentic (e.g., has not been modified since the update was provided by the authorized entity). In an example embodiment, the second TA-HOST 422B may confirm, certify, and/or the like that the instance of information/data and/or the record, block, and/or the like comprising the at least a portion of the update is signed using a signatory key corresponding to an authorized entity (e.g., signed by the first TA-HOST 422A which is a participant in the TA-NET and/or by a user and/or user account having permission to perform/call administrative functions of the TA-NET) and is authentic (e.g., has not been modified since the update was provided by the authorized entity). In an example embodiment, the second TA-HOST 422B may confirm that the entry comprising the at least a portion of the update was encrypted using an encryption key of the TA-NET. In an example embodiment, the second TA-HOST 422B may perform an attestation of the second TA-HOST 422B, second node computing entity 200B, and/or the like to confirm and/or certify that the hardware of the second node computing entity 200B is capable of maintaining a trusted execution environment 420B in accordance with requirements of the update, that one or more partitions are in place that define the trusted execution environment 420B, the second TA-HOST 422B, and/or the like in accordance with any system requirements of the update, and/or the like. In an example embodiment, a public key corresponding to one or more hardware elements of the second node computing entity 200B (e.g., one or more computer chips corresponding to the processing element 205, memory 210, 215, and/or the like) may be used to perform the attestation. For example, a public key corresponding to one or more hardware elements of the second node computing entity 200B may be used to ensure the hardware elements' compliance with trusted computing standards, to ensure hardware elements' and/or program code of the second TA-HOST's 422B compliance with the system requirements of the update, and/or to prove the identity of the one or more hardware elements. For example, a certified attestation identity key (possibly provided by a third party) may be used to perform the attestation. For example, the attestation may be performed using a remote attestation, direct anonymous attestation, or other attestation process.

At 714, responsive to a positive result from performing the attestation of the update, the entry (e.g., instance of information/data and/or record, block, and/or the like) comprising the at least a portion of the update, and/or the second node computing entity 200B, second TA-HOST 422B, the trusted execution environment 420B, and/or the like, the second TA-SEC 428B may be updated based on the update.

For example, the application program code provided by the entry comprising the at least a portion of the update may be used to update the second TA-SEC 428B. For example, the second TA-HOST 422B may cause the installed application program code corresponding to the trusted application 424 and/or the second TA-SEC 428B to be updated based on the application program code provided by the entry comprising the at least a portion of the update read from the secure ledger 430. In an example embodiment, the second TA-HOST 422B may cause the installed application program code corresponding to the trusted application 424 and/or the second TA-SEC 428B to be uninstalled and the new version of the application program code corresponding to the trusted application 424 and/or the second TA-SEC 428B provided by the update to be installed (e.g., in the trusted execution environment 420A). As should be understood, the second TA-HOST 422B may decrypt and/or cause the trusted application 424 (e.g., the second TA-SEC 428B) to decrypt the entry comprising the at least a portion of the update using a decryption key of the TA-NET (e.g., a key generated at 518). If the result of the attestation result is not a positive result, a notification may be provided to the user via the user computing entity 30, the process may be ended, and/or the like.

Thus, through the use of the secure ledger 430 and various attestation, validation, certification, and/or authentication processes, an existing TA-SEC 428 may be updated across each of the node computing entities 200 of the TA-NET within the distributed system 100 in a trackable and/or documented manner.

d. Performing a Function of the Distributed System

In various embodiments, a user may interact with an API (e.g., TA-SEC API 414 and/or TA-SUP API 416) to request performance of a function of the distributed system 100. In an example embodiment, the function of the distributed system 100 may be providing information/data in response to a request submitted by the user. In an example embodiment, the function of the distributed system 100 may be conducting, facilitating, and/or validating a transaction and/or action submitted and/or requested by the user. In an example embodiment, the function of the distributed system 100 may be executing at least a portion of a smart contract responsive to identifying one or more triggers of the smart contract to conduct, perform, facilitate, and/or validate one or more transactions and/or actions. In an example embodiment, a trigger of the smart contract may be information/data submitted by the user. In an example embodiment, a trigger of the smart contract may be the lack of a particular submission by the user in a predefined time frame, and/or the like. FIG. 8 provides a data flow diagram of an example process to securely perform a function of the distributed system 100.

Starting at 802, a user (e.g., human user interacting with a user computing entity 30 via a user interface and/or machine user) may operate a user computing entity 30 to provide (e.g., transmit) a function request. In various embodiments, the function request may comprise the information/data necessary for a node computing entity 200 to perform the function. For example, the function request may identify the function, a function type corresponding to the function, the user and/or user account requesting the function performance, one or more instances of information/data needed for performing the function that are not available to the TA-SEC 428 via the secure ledger 430 and/or information/data regarding how to obtain one or more instances of information/data needed for performing the function that are not available to the TA-SEC 428 via the secure ledger 430.

In an example embodiment, a first node computing entity 200A may receive (e.g. via the communications interface 220) the function request. For example, the first TA-HOST 422A may receive the function request from the communications interface 220 and may pass and/or provide the function request to TA-SEC API 414. For example, the first TA-HOST 422A may expose the TA-SEC API 414 such that the TA-SEC API 414 may receive the function request. In an example embodiment, the function request is encrypted using a public key associated with the trusted application 424 and/or corresponding to the function identified in the function request. As should be understood, the TA-SEC API 414 may be specific to the trusted application 424 and may have access to the private key corresponding to the trusted application 424 for decrypting the function request. In an example embodiment, the function request may be received by the TA-SUP API 416.

At 804, responsive to receiving the function request and/or responsive to processing at least in part the function request, the TA-SEC API 414 may provide a user authentication request to the first TA-SEC 428A. In an example embodiment, the user authentication request may comprise at least a portion of the information/data identifying the user requesting the function provided by the function request. In an example embodiment, the first TA-SEC 428A may receive and process the user authentication request. In an example embodiment, responsive to receiving and/or processing the user authentication request, the first TA-SEC 428A may authenticate the user requesting the function based on the provided information identifying the user. In an example embodiment, the user may be authenticated based on information/data stored in the secure ledger 430 or another data store accessible to the first node computing entity 200A, the first TA-HOST 422A, and/or the first TA-SEC 428. In an example embodiment, the user requesting the function may be authenticated by applying a public and/or authentication key to the function request to determine if the function request and/or a portion thereof was signed with the private and/or signing key of the user. In various embodiments, the user authentication may be performed using a username/password style authentication; a user private key used to sign the function request and/or a portion thereof; a private key stored on a trusted platform module (TPM) and/or hardware security module (HSM) corresponding to the one or more partitions that define the trusted execution environment 420A; using a third party authentication system (e.g., security assertion markup language (SAML), lightweight directory access protocol (LDAP), an open standard for access delegation (e.g., OAuth), and/or the like, wherein the first TA-SEC 428A has its own authentication method for authenticating the third party authentication system and interacts with the third party authentication system via APIs 414, 416; and/or other user authentication method.

Responsive to authenticating the user requesting the function based on the information/data identifying the user provided by the function request (e.g., determining that the user is the user and/or corresponds to the user account that they claim to be) the first TA-SEC 428A may request the user permissions corresponding to the user and/or user account requesting the function performance at 806. For example, the first TA-SEC 428A may access the secure ledger 430 (e.g., issue a read and/or get command) for information/data corresponding to the user permissions assigned to the user and/or user account requesting the function performance. In an example embodiment, the user permissions for one or more users and/or user accounts may be stored by a user database stored by the node computing entity 200 (e.g., separate from the secure ledger 430) and/or accessible to the node computing entity 200 (e.g., via network 135). At 808, the first TA-SEC 428A may receive information/data identifying the user permissions assigned to the user and/or user account requesting the function performance from the secure ledger 430, a user database, and/or the like. In an example embodiment, the received information/data identifying the user permissions may be encrypted based on an encryption key of the TA-NET (e.g., generated at 518) and the first TA-SEC 428A may decrypt the received information/data identifying the user permissions using a decryption key of the TA-NET (e.g., generated at 518).

At 810, the first TA-SEC 428A validates the user and/or user account requesting performance of the function as identified in the function request. For example, the user permissions assigned to the user and/or user account may be analyzed in light of the function and/or function type identified in the function request to determine if the user and/or user account requesting performance of the function is assigned user permissions that would allow and/or enable the user to perform the function. In an example embodiment, if it is determined (e.g., by the first TA-SEC 428A) that the user and/or user account requesting performance of the function does not have the appropriate user permissions for the function and/or function type identified in the function request, the process may terminate and/or an error message may be provided (e.g., transmitted) to the user computing entity 30. In an example embodiment, if it is determined (e.g., by the first TA-SEC 428A) that the user and/or user account requesting performance of the function does not have the appropriate user permissions for the function and/or function type identified in the function request, a modified function may be performed. For example, if the requested function would cause first information/data and second information/data to be provided to the user computing entity 30 but the requesting user and/or user account only has permission to view the first information/data, a modified function may be performed that only provides the first information/data to the user computing entity 30. In another example, the modified function may only use information/data that the user and/or user account has permission to access. In an example embodiment, if it is determined (e.g., by the first TA-SEC 428A) that the user and/or user account requesting performance of the function does have the appropriate user permissions for the function and/or function type identified in the function request, the process may continue by providing a user validation message to the TA-SEC API 414.

At 812, responsive to authenticating the user and/or user account requesting performance of the function, as identified in the performance request, and determining that the user and/or user account is assigned appropriate user permissions for requesting the function and/or a function of the function type identified in the function request, the first TA-SEC 428A may provide a user validation message to the TA-SEC API 414. In an example embodiment, the user validation message indicates that the user is authenticated and is assigned the appropriate user permissions for the requesting the function and/or a function of the function type identified in the function request. At 814, responsive to receiving and/or processing the user validation message, the TA-SEC API 414 may provide a performance request to the first TA-SEC 428A. In particular, the performance request may instruct the first TA-SEC 428A to perform the function identified in the function request. In an example embodiment, the performance request may provide information/data provided by the function request and/or the information/data regarding where to access information/data for performance of the function provided by the function request. In an example embodiment, a user partial validation message may be provided to the TA-SEC API 414 and a performance request for a modified function may be provided to the first TA-SEC 428A by the TA-SEC API 414 if the user and/or user account identified in the function request does not have sufficient user permissions for the requested function and/or function type.

At 816, the first TA-SEC 428A may request (e.g., provide a get call/command) to the secure ledger 430 (or another secured shared resource) to access the information/data stored in the secure ledger 430 (or other secured shared resource) that is required for executing and/or performing the requested function. The requested data may be received from the secure ledger 430 (or other secured shared resource) at the first TA-SEC 428A. In an example embodiment, the secure ledger 430 is a distributed ledger and a copy of the distributed ledger is stored in local ledger files 432 in an appropriate location in memory 210, 215 (e.g., a location accessible via the trusted execution environment 420A). In such an embodiment, the requested data may be accessed from the local ledger files 432. The accessed data may be encrypted (e.g., via an appropriate encryption key of the TA-NET) and may be decrypted by the first TA-SEC 428A using the appropriate decryption key of the TA-NET. At 818, the first TA-SEC 428A may process the information/data received from the secure ledger 430 (or other secured shared resource) based on and/or in accordance with the application program code (e.g., by executing the application program code and/or at least a portion thereof) corresponding to the first TA-SEC 428A to perform the requested function (and/or modified function in some scenarios as described above). For example, the first TA-SEC 428A may execute a smart contract and/or a portion thereof using information/data received from and/or stored in the secure ledger 430 (or other secured shared resource), instances of information/data received in the function request, and/or the like. In an example embodiment, the execution of the first TA-SEC 428A and/or the processing of the information/data received from and/or stored in the secure ledger 430 (or other secured shared resource) further utilizes information/data provided in the function request and/or information/data for which the function request provides instructions and/or a location where such information/data may be accessed. For example, if the function to be performed is a transaction, the information/data provided by the function request may indicate an account to be debited, an account to be credited, a value to be debited and/or credited, and/or other information/data corresponding to the function and the information/data accessed from the secure ledger 430 (or other secured shared resource) comprise an indication of whether the account to be debited has sufficient contents/value that the value to be debited may be debited therefrom.

The execution of the application program code and/or at least a portion thereof using the information/data received from and/or stored in the secure ledger 430 (or other secured shared resource), and possibly other information/data, is performed within the trusted execution environment 420A such that any confidential information accessed from the secure ledger 430 is maintained in a secure environment and the integrity and/or authenticity of the application program code (e.g., smart contract and/or the like) corresponding to the first TA-SEC 428A is ensured, able to be validated, and is trackable.

At 820, the first TA-SEC 428A may post a new entry to the secure ledger 430. In various embodiments, the new entry may comprise information/data corresponding to a transaction and/or action, an instance of information/data, record, block, and/or the like indicating the performance of the requested function (and/or modified function), a result of the performance of the requested function (and/or modified function), a user and/or user account identifier identifying the user and/or user account that requested the performance of the function, and/or other information/data corresponding to the performance of the function (e.g., information/data regarding why a modified function was performed, and/or the like). In an example embodiment, posting the new entry to the secure ledger 430 may comprise signing the new entry using a private signing key corresponding to the first TA-SEC 428A, first TA-HOST 422A, and/or the like; encrypting the new entry using an appropriate encryption key of the TA-NET; conducting, facilitating, and/or providing the entry for a validation and/or consensus process; and/or the like. In an example embodiment, if the secure ledger is a distributed ledger, posting the new entry to the secure ledger 430 may comprise storing the new entry in the local ledger files 432 and distributing and/or disseminating the new entry via the distributed ledger in accordance with the validation and/or consensus process of the ledger.

In an example embodiment, the secure ledger 430 may generate and provide a new entry confirmation indicating that the new entry has been stored to the secure ledger 430. For example, if the secure ledger 430 is a distributed ledger, the new entry confirmation may confirm that the new entry has been vetted via the validation and/or consensus process of the ledger and that the new entry has now been entered and/or stored in the secure ledger 430. In an example embodiment, the first TA-SEC 428A may receive the new entry confirmation. At 824, in response to receiving and/or processing the new entry confirmation, the first TA-SEC 428A may generate and provide a performance confirmation to the TA-SEC API 414 confirming that the requested function (and/or modified function) has been performed and providing any information/data to be returned to the user computing entity 30 for provision to the user as a result of performing the requested function (and/or modified function).

At 826, the TA-SEC API 414 receives and/or process the performance confirmation. Responsive to receiving and/or processing the performance confirmation, the TA-SEC API 414 may generate and/or provide a function confirmation to the user computing entity 30. For example, the TA-SEC API 414 may generate a function confirmation and cause and/or instruct a communications interface 220 to provide the function confirmation. In an example embodiment, the function confirmation may comprise a confirmation that the function (and/or modified function) was performed, completed, and/or the like; any information/data to be provided to the user as a result of performing the requested function (and/or modified function); and/or the like. The user computing entity 30 may receive the function confirmation (e.g., via a communications interface thereof) and process the function confirmation. Responsive to processing the function confirmation, the user computing entity 30 may provide the user with any information/data to be provided to the user as a result of performing the request function (and/or modified function). For example, a user interface of the user computing entity 30 may display, audibly provide, and/or the like any information/data to be provided to the user as a result of performing the request function (and/or modified function) to a human user that requested the function be performed. In another example, the user computing entity 30 may provide any information/data to be provided to the user as a result of performing the request function (and/or modified function) to an API and/or the like corresponding to the machine user that requested the function be performed. As should be understood, the information/data ultimately returned to the requesting user is information/data appropriate for the user permissions assigned to the requesting user.

e. Advantages

Various embodiments provide a variety of technical improvements over traditional distributed systems. In particular, various embodiments provide technical improvements regarding the ability of distributed systems to securely store confidential information/data. In particular, in various embodiments of the present invention, confidential information/data is stored in a secure ledger such that that is only accessible to the secure domain of trusted applications (TA-SECs). The application program code corresponding to the secure domain of the trusted applications is installed and executed in the trusted execution environment of one or more node computing entities of the distributed system. Moreover, the confidential information/data is stored in the secure ledger is stored in an encrypted manner. The encryption and decryption keys used for encrypting and decrypting information/data stored in the secure ledger are stored within the trusted execution environment such that they are accessible to the secure domain of the trusted application and buffered and/or protected from network based attacks. Thus, the confidential information/data stored in the secure ledger is stored in a secure manner but is easily accessible to entities having permission to access the confidential information/data (e.g., the secure domain of trusted applications of the trusted application network) via public/private keys and/or other encryption mechanisms. Examples of the present invention further protect confidential information/data while the application is running and/or being executed within the trusted execution environment such that confidential information/data cannot be accessed and/or manipulated during the running and/or execution of the application by someone with either physical or remote access.

Additionally, the application program code corresponding to the secure domain of the trusted application is loaded, installed, and/or executed within a trusted execution environment of a node of the distributed system. Thus, the authenticity and/or integrity of the application program code corresponding to the secure domain of the trusted application may be ensured, validated, and/or tracked. Moreover, the secure domain of the trusted application may be updated in place in a documented manner. Thus, the performance of the functions of the distributed network, as performed by executing application program code (e.g., smart contracts, and/or the like) corresponding to the secure domain of the trusted application is not viewable by other applications outside of the trusted application network and is performed as intended and/or programmed by an authorized user that provided the most recent version of the application program code. Thus, various embodiments of the present invention provide increased security and trustability of the performance of functions of the distributed system.

Moreover, access to the functions provided by the secure domain of the trusted application are accessible and/or the secure domain of the trusted application may be interfaced with using secure and/or supplemental APIs that maintain the isolation of the secure domain of the trusted application within the trusted execution environment. The secure and/or supplemental APIs may be exposed via a trusted application host service operating on the node computing entity. Access to the functions and/or interfacing with the secure domain of the trusted application may therefore be easily controlled using user permissions and user authentication methods.

Thus, various embodiments of the present invention provide for greater security of confidential data stored by a distributed system, in a secure ledger, and/or the like. In some example embodiments, the secure ledger is a distributed ledger and/or blockchain database. Moreover, various embodiments of the present invention enable authentication and trackability of the application program code use to perform various functions of the distributed system, including functions that require access to and/or processing of confidential information/data. Additionally, various embodiments of the present invention provide an efficient and robust process for accessing and/or interfacing with the secure domain of a trusted application and an efficient and robust process for controlling accessing and/or user interfacing with the secure domain of the trusted application.

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for securely executing a function of a distributed system, the method comprising:
   responsive to processing a function request identifying a function of the distributed system by a node computing entity, accessing application program code corresponding to the function within a trusted execution environment, wherein the node computing entity comprises (a) a processor, a memory, and a communication interface and (b) one or more partitions defining the trusted execution environment;
   based on data stored in a secured shared resource maintained by the distributed system, executing the application program code within the trusted execution environment to generate a result;
   generating a new entry comprising the result and encrypting at least a portion of the new entry using an encryption key, within the trusted execution environment; and
   posting the encrypted new entry to the secure ledger;
   wherein the function request comprises user identifying information and the method further comprises:
   validating the user identifying information and user permissions corresponding to a user identified by the user identifying information; and
   responsive to validating the user identifying information and user permissions, identifying the trigger corresponding to the function;
   wherein, responsive to determining that the user permissions do not permit a user requesting the function to perform the function, performing a modified function that is permitted by the user permissions to generate the result.

2. The method of claim 1, wherein the method further comprises, responsive to the new entry being confirmed through a validation and consensus process of the secure ledger, providing a function confirmation to the user computing entity via the communication interface.

3. The method of claim 1, wherein the function request is received by a secure domain of an application corresponding to the function via an application programming interface (API).

4. The method of claim 1, wherein the secure ledger comprises at least one of a distributed ledger, a blockchain, a distributed data store, a key/value pair, a database, a file, or a log.

5. The method of claim 1, wherein the application program code comprises a smart contract.

6. The method of claim 1, wherein at least a portion of the secure ledger encrypted using an encryption key corresponding to the trusted execution environment.

7. The method of claim 1, wherein the secure ledger is a secure data repository and at least a portion of the secure ledger is encrypted with an encryption key corresponding to a secure domain of an application corresponding to the function.

8. The method of claim 1, wherein access to the at least a portion of the secure ledger is controlled with public/private key encryption.

9. The method of claim 1, wherein the function corresponds to a trusted application of a trusted application network comprising one or more trusted applications programmed to securely communicate with one another via at least one of the secured shared resource or the secure ledger.

10. The method of claim 9, wherein the secure ledger stores information and results corresponding to the one or more applications of the trusted application network.

11. The method of claim 1, wherein the secured shared resource comprises the secure ledger.

12. An apparatus for securely executing a function of a distributed system, the apparatus being a node of a plurality of nodes of the distributed system, the apparatus comprising at least one processor, a communications interface configured for communicating via at least one network, and at least one memory storing computer program code, the apparatus comprising at least one partition defining a trusted execution environment, the at least one memory and the computer program code configured to, with the processor, cause the apparatus to at least:
   responsive to processing a function request identifying a function of the distributed system, access application program code corresponding to the function within the trusted execution environment;
   based on data stored in a secured shared resource maintained by the distributed system, execute the application program code to generate a result within the trusted execution environment;
   generate a new entry comprising the result and encrypt at least a portion of the new entry using an encryption key, within the trusted execution environment; and
   post the encrypted new entry to the secure ledger;
   wherein the function request comprises user identifying information and the computer program code is further configured to, with the processor, cause the apparatus to at least:
   validate the user identifying information and user permissions corresponding to a user identified by the user identifying information; and
   responsive to validating the user identifying information and user permissions, identify the trigger corresponding to the function;

wherein, responsive to determining that the user permissions do not permit a user requesting the function to perform the function, performing a modified function that is permitted by the user permissions to generate the result.

13. The apparatus of claim 12, wherein the function request is received by a secure domain of an application corresponding to the function via an application programming interface (API).

14. The apparatus of claim 12, wherein the secure ledger comprises at least one of a distributed ledger, a blockchain, a distributed data store, a key/value pair, a database, a file, or a log.

15. The apparatus of claim 12, wherein the application program code comprises a smart contract.

16. A computer program product for securely executing a function of a distributed system, the computer program product comprising at least one non-transitory computer-readable storage medium having computer-executable program code instructions stored therein, the computer-executable program code instructions comprising program code instructions configured to, when executed by a processor of a node computing entity of a plurality of node computing entities of the distributed system, cause the node computing entity to:

responsive to processing a function request identifying a function of the distributed system, access application program code corresponding to the function within a trusted execution environment, wherein the node computing entity (a) comprises the processor, a memory, and a communication interface and (b) comprises one or more partitions defining the trusted execution environment;

based on data stored in a secured shared resource maintained by the distributed system, execute the application program code to generate a result within the trusted execution environment;

generate a new entry comprising the result and encrypt at least a portion of the new entry using an encryption key, within the trusted execution environment; and post the encrypted new entry to the secure ledger;

wherein the function request comprises user identifying information and the computer program code is further configured to, with the processor, cause the apparatus to at least:

validate the user identifying information and user permissions corresponding to a user identified by the user identifying information; and responsive to validating the user identifying information and user permissions, identify the trigger corresponding to the function;

wherein, responsive to determining that the user permissions do not permit a user requesting the function to perform the function, performing a modified function that is permitted by the user permissions to generate the result.

* * * * *